(12) United States Patent
Kundracik et al.

(10) Patent No.: US 9,138,818 B2
(45) Date of Patent: Sep. 22, 2015

(54) SYSTEMS AND DEVICES FOR PERFORMING POWERED THREADING OPERATIONS

(75) Inventors: Richard Kundracik, Elyria, OH (US);
Paul W. Gress, Bay Village, OH (US);
James E. Hamm, Grafton, OH (US);
Glen R. Chartier, Avon Lake, OH (US)

(73) Assignee: Emerson Electric Co., St. Louis, MO (US)

( * ) Notice: Subject to any disclaimer, the term of this patent is extended or adjusted under 35 U.S.C. 154(b) by 1045 days.

(21) Appl. No.: 13/207,610

(22) Filed: Aug. 11, 2011

(65) Prior Publication Data

US 2012/0039679 A1 Feb. 16, 2012

Related U.S. Application Data

(60) Provisional application No. 61/374,038, filed on Aug. 16, 2010.

(51) Int. Cl.
| | | |
|---|---|---|
| *B23G 1/02* | (2006.01) | |
| *B23G 1/24* | (2006.01) | |
| *B23G 1/22* | (2006.01) | |
| B23G 1/44 | (2006.01) | |

(52) U.S. Cl.
CPC B23G 1/24 (2013.01); B23G 1/225 (2013.01); *Y10T 408/03* (2015.01); *Y10T 408/5633* (2015.01)

(58) Field of Classification Search
CPC .............. B23B 5/16; B23G 1/22; B23G 1/34; B23G 1/225; B23Q 15/00; B23Q 15/07
USPC .............. 82/1.11, 47, 118; 318/565; 408/1 R, 408/104; 409/74
See application file for complete search history.

(56) References Cited

U.S. PATENT DOCUMENTS

| | | | |
|---|---|---|---|
| 2,581,702 A | | 1/1952 | Quijada |
| 4,751,442 A | * | 6/1988 | Kurakake ...................... 318/567 |
| 4,772,830 A | | 9/1988 | Kobari et al. |
| 5,009,554 A | * | 4/1991 | Kameyama et al. .......... 409/231 |
| 5,730,643 A | | 3/1998 | Bartlett et al. |
| 5,744,921 A | | 4/1998 | Makaran |
| 5,808,893 A | | 9/1998 | Pugh et al. |

(Continued)

FOREIGN PATENT DOCUMENTS

| | | |
|---|---|---|
| EP | 1197818 | 4/2002 |
| EP | 1923978 | 5/2008 |

(Continued)

OTHER PUBLICATIONS

The International Bureau of WIPO, International Search Report and Written Opinion of the International Searching Authority, Oct. 21, 2011 (14 pages) for application PCT/US2011/047758.

*Primary Examiner* — Will Fridie, Jr.
(74) *Attorney, Agent, or Firm* — Mark E. Bandy; Rankin, Hill & Clark LLP

(57) ABSTRACT

A device and associated system for threading, cutting, and reaming pipe ends are described. The device and system utilizes a brushless DC electric motor. The devices also include on-board electronics and operator interface(s) to provide sophisticated control and information as to the various operations. Also described are methods of operating the devices and several different modes for performing various operations.

4 Claims, 25 Drawing Sheets

(56) References Cited

U.S. PATENT DOCUMENTS

| | | | |
|---|---|---|---|
| 5,871,389 | A | 2/1999 | Bartlett et al. |
| 6,473,562 | B1 | 10/2002 | Stephan |
| 6,487,944 | B2 * | 12/2002 | Endo et al. .................... 82/1.11 |
| 7,007,762 | B2 | 3/2006 | Yamamoto |
| 7,029,384 | B2 | 4/2006 | Steimel et al. |
| 7,114,933 | B2 | 10/2006 | Adachi et al. |
| 7,115,018 | B1 | 10/2006 | Syverson |
| 7,215,089 | B2 | 5/2007 | Toyozawa et al. |
| 7,556,103 | B2 * | 7/2009 | Matsunaga ...................... 173/2 |
| 7,699,687 | B2 | 4/2010 | Nordstrom |
| 8,636,079 | B2 * | 1/2014 | Totsu ................................ 173/1 |
| 2003/0156913 | A1 * | 8/2003 | Willis ............................. 409/74 |
| 2008/0067270 | A1 | 3/2008 | Strutz |
| 2008/0264220 | A1 * | 10/2008 | Rigolone et al. ................ 82/118 |
| 2009/0060477 | A1 | 3/2009 | Hirsch et al. |
| 2009/0266113 | A1 | 10/2009 | Musser et al. |
| 2009/0294508 | A1 | 12/2009 | Kunz et al. |
| 2009/0308628 | A1 | 12/2009 | Totsu |
| 2010/0027979 | A1 * | 2/2010 | Matsunaga et al. ........... 388/811 |
| 2010/0028095 | A1 | 2/2010 | Yang et al. |
| 2012/0039679 | A1 * | 2/2012 | Kundracik et al. ........... 408/1 R |

FOREIGN PATENT DOCUMENTS

| | | |
|---|---|---|
| JP | 57113786 | 7/1982 |
| JP | 10277840 | 10/1998 |
| JP | 2004180399 | 6/2004 |

* cited by examiner

SYSTEMS AND DEVICES FOR PERFORMING POWERED THREADING OPERATIONS

CROSS REFERENCES TO RELATED APPLICATIONS

This application claims priority from U.S. provisional application Ser. No. 61/374,038 filed on Aug. 16, 2010.

FIELD OF THE INVENTION

The present invention relates to powered devices for performing a variety of operations upon workpieces and particularly, devices for cutting, reaming, and threading pipe ends. The invention also relates to powered devices for cutting, removing, and/or forming workpiece materials.

BACKGROUND OF THE INVENTION

Threads are used on a wide array of mechanical components, piping, and conduit for engaging components together and/or to provide a sealing connection between components. Numerous thread sizes and thread configurations are known, such as tapered threads and non-tapered or "straight" threads. Within each class, a variety of different thread forms have been developed and used depending upon the application, type of workpiece, customs of the locale, and preferences of the user.

Devices for forming threads on pipe ends are well known in the art. Such devices use one or more dies that form a helical thread extending from one region of the pipe to another region. The die is orbited about the axis of the pipe and/or the pipe is rotated while the die is engaged with a select region of the pipe to form the thread.

When assembling piping systems or when forming custom piping layouts, sections of pipe are typically cut and threaded at a construction or assembly site. As a result, portable or semi-portable pipe threading devices have been developed which can be used at the job site to prepare threaded pipe ends. Many of these devices are powered by electric motors and include one or more accessories for performing other operations typically associated with threading, such as cutting and reaming operations. As far as is known, these previous threading devices were relatively inefficient in terms of power consumption and limited in the extent of control features. As a result, relatively low productivity levels were associated with previously known devices. Additionally, previously known threading devices had relatively low durability as a result of the use of components susceptible to wear, i.e. brushes.

Although most currently available threading devices are satisfactory, it would be desirable to provide an improved device. Specifically, it would be beneficial to provide a threading device which operated with greater efficiency than currently known devices. It would also be desirable to provide a threading device that would enable gains in productivity. And, it would be desirable to provide a device that exhibits a high level of durability.

SUMMARY OF THE INVENTION

The difficulties and drawbacks associated with previously known systems are addressed by the present devices, systems and methods for performing one or more operations on a workpiece such as pipe or conduit.

In one aspect, the present invention provides a powered threader device comprising a frame assembly, a selectively releasable chuck assembly adapted for retaining and rotating a workpiece about a workpiece central axis, a selectively positionable die assembly for forming threads in the workpiece, and a brushless DC electric motor supported by the frame assembly. The brushless motor provides a powered rotary output in selectable engagement with the chuck assembly to thereby selectively rotate the workpiece.

In another aspect, the present invention provides a powered threader device comprising a frame assembly, a brushless DC electric motor supported on the frame assembly providing a powered rotary output, a selectively releasable chuck assembly supported on the frame assembly and adapted for retaining and rotating a workpiece about a workpiece central axis, a drive train for transmitting rotary motion from the rotary output of the brushless motor to the chuck assembly, a selectively positionable die assembly supported on the frame assembly for forming threads in the workpiece, and control provisions for controlling rotation of the workpiece and position of the die assembly.

In still another aspect, the present invention provides a method of forming a thread in a workpiece. The method comprises releasably securing a workpiece in a chuck assembly adapted for retaining and rotating the workpiece about a workpiece central axis. The method also comprises contacting a selectively positionable thread forming die with the workpiece. And, the method additionally comprises rotating the workpiece by use of a brushless DC electric motor. Upon rotation of the workpiece about the workpiece central axis, the thread forming die is contacted with the workpiece to thereby form a thread in the workpiece.

In yet another aspect, the present invention provides a method for monitoring operation of a powered threader device. The method comprises activating the threader device such that the device is placed in electrical communication with a source of electrical power. The method also comprises comparing the incoming electrical current to a threshold value, whereby if the incoming current is less than the threshold value the method is placed in a hold state, and if the incoming current is greater than the threshold value the method proceeds to an integrating operation. The method additionally comprises integrating electrical current consumed by the threader device as a function of time during at least a portion of operation of the threader device, to thereby produce an integration value. The method further comprises comparing the integration value to at least one benchmark or archived value stored in an electronic memory unit of the threader device, the benchmark or archived value selected from the group consisting of a value representative of a cutting operation, a value representative of a reaming operation, and a value representative of a threading operation. And, the method also comprises identifying the type of operation performed by the threader device by determining which of the benchmark or archived values most closely corresponds to the integration value.

In still another aspect, the present invention provides a method for monitoring operation of a powered threader device. The method comprises activating the threader device such that the device is placed in electrical communication with a source of electrical power. The method additionally comprises comparing the incoming electrical current to a first threshold value, whereby if the incoming current is less than the first threshold value the method is placed in a hold state, and if the incoming current is greater than the first threshold value the method proceeds to a sensor monitoring operation. The method also comprises monitoring at least one sensor output of the threader device, the sensor selected from the group consisting of a cutter sensor, a reamer sensor, and a thread or die sensor. The method additionally comprises comparing magnitude of instantaneous electrical current consumed to a second threshold value, whereby if the instantaneous current magnitude is greater than the second threshold value, the method proceeds to another comparing operation. The method also comprises comparing an output of the at least one sensor and the instantaneous electrical current to at least one set of benchmarks or archived values selected from the group consisting of values representative of a cutting operation, values representative of a reaming operation, and values representative of a threading operation. And, the method further comprises identifying the type of operation performed by the threader device by determining which of the benchmark or archived values most closely correspond to the output of the at least one sensor and the instantaneous electrical current.

In another aspect, the present invention provides a method for performing a threading operation on a workpiece using a powered threader device. The method comprises securing the workpiece in the threader device, obtaining parameters for the desired threading operation, determining the target thread length, and confirming existence of appropriate conditions thereby enabling the threading operation. The method also comprises rotating the workpiece while secured in the threader device. The method additionally comprises contacting and engaging a threading die or tool with the workpiece. The method also comprises linearly displacing the threading die or tool alongside the workpiece to thereby form a helical thread. The method further comprises monitoring the distance of linear displacement of the threading die or tool. And, the method comprises comparing the distance of linear displacement of the threading die or tool to the target thread length. The method further comprises concluding the threading operation upon the distance of linear displacement of the threading die or tool being equal to or greater than the target thread length.

In still another aspect, the present invention provides a method for performing a threading operation on a workpiece using a powered threader device including a brushless DC electric motor. The method comprises securing the workpiece in the threader device. The method also comprises obtaining parameters for the desired threading operation. The method additionally comprises determining the target thread revolutions. The method also comprises confirming existence of appropriate conditions thereby enabling the threading operation. The method then involves rotating the workpiece while secured in the threader device by activating the brushless DC electric motor. The method comprises contacting and engaging a threading die or tool with the workpiece. The method comprises linearly displacing the threading die or tool alongside the workpiece to thereby form a helical thread. The method also comprises monitoring the angular displacement of the brushless DC electric motor. The method additionally comprises comparing the angular displacement of the brushless DC electric motor to the target thread revolutions. And, the method further comprises concluding the threading operation upon the angular displacement of the brushless DC electric motor being equal to or greater than, the target thread revolutions.

As will be realized, the invention is capable of other and different embodiments and its several details are capable of modifications in various respects, all without departing from the invention. Accordingly, the drawings and description are to be regarded as illustrative and not restrictive.

DETAILED DESCRIPTION OF THE EMBODIMENTS

Figure 1:
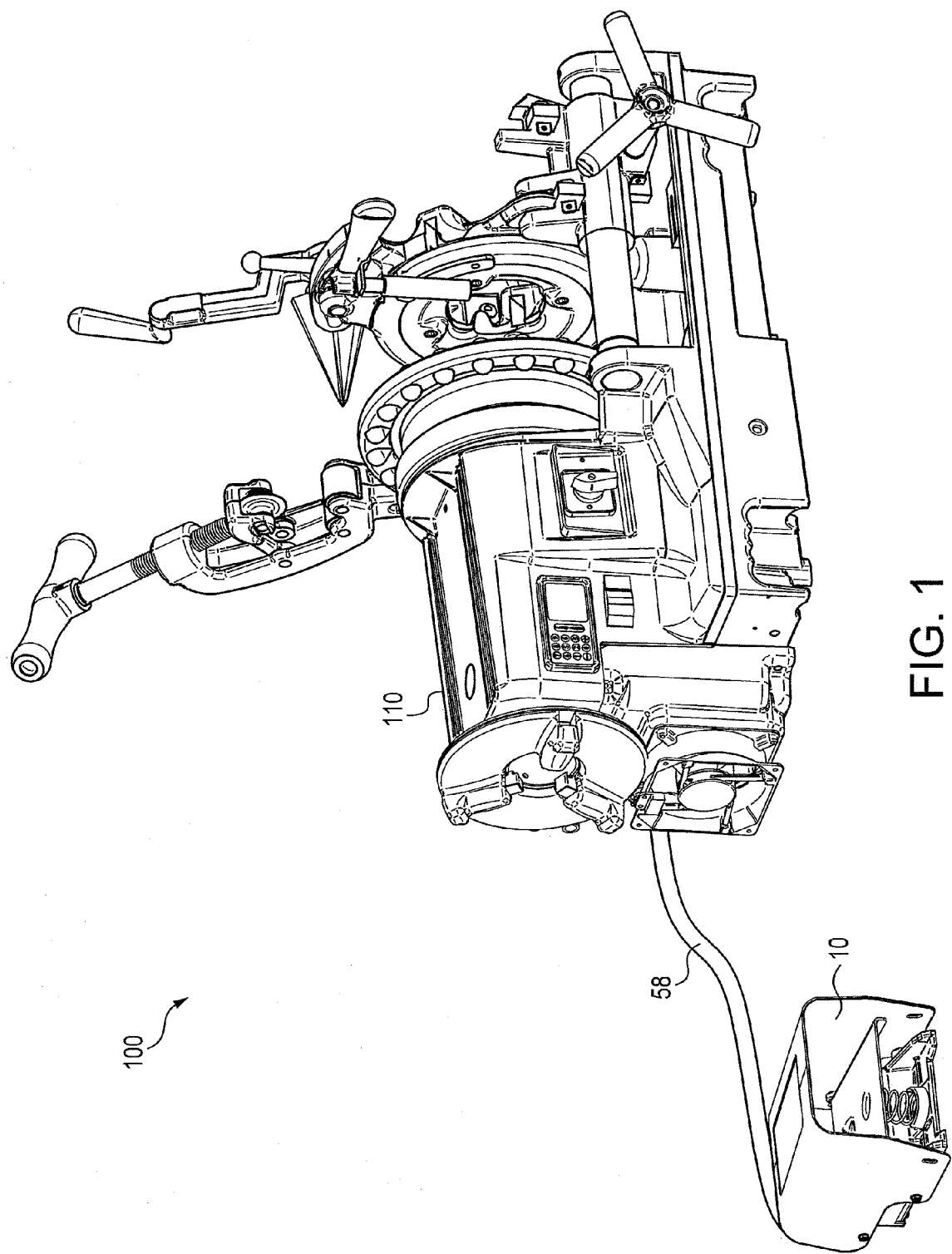
FIG. 1 is a perspective view of a preferred embodiment thread forming device in accordance with the present invention.

The present invention provides various devices, systems, and methods for performing various operations. For purposes of understanding the invention, the invention will be described in terms of thread forming devices. However, it will be understood that in no way is the invention limited to these particular embodiments.

The present invention threader device provides significantly increased levels of operating efficiency and productivity gains as compared to previous devices. As explained in greater detail herein, by enabling control of threading, cutting, and reaming operations using information obtained by associated sensors, the threader device provides significant improvements in productivity. The present invention threader device also exhibits greater durability as compared to previous devices.

As explained herein, certain versions of the present invention threader device include various features that enable improved operator control over the device and its components. For example, multiple modes of operation are provided whereby a threading operation can be performed in which one or more parameters relating to electrical current consumption, cycle counting, and sensor feedback are utilized to control the operation of the device. Moreover, the device may be operated at relatively high efficiency levels due at least in part to operational gains from the use of certain motors, and user selected controls.

Brushless Motor

In accordance with the present invention, the various devices and systems described herein preferably utilize a brushless DC electric motor. Preferably, the electric motor is a brushless direct current (DC) electric motor, sometimes referred to in the art as a BLDC motor. A brushless DC (BLDC) motor is a synchronous electric motor powered by direct current (DC) electricity using an electronic commutation system, rather than a mechanical commutator and brushes.

Two types of BLDC motors exist. A stepper or servo motor type may have multiple poles on the rotor, which is generally in the form of a fixed permanent magnet. This type is referred to herein as a permanent magnet brushless DC electric motor. The second type of BLDC motor is a reluctance motor. This second type may not have permanent magnets, but instead use salient poles that are pulled into alignment by a timed drive. This type is referred to herein as a switched reluctance brushless DC electric motor.

In a BLDC motor, the electromagnets do not move. Instead, the rotor or permanent magnets rotate and the stator remains static. This overcomes the challenge of how to transfer current to a moving electromagnet. In order to turn the rotor, the brush-system/commutator assembly of a conventional motor is replaced by an electronic controller. The controller performs a timed power distribution similar to that found in a brushed DC motor, but uses a solid-state circuit rather than a commutator/brush system.

BLDC motors offer several advantages over conventional brushed DC motors, including higher efficiency and reliability, reduced noise, longer lifetime (no brush and commutator wear), elimination of ionizing sparks from the commutator, more power, and overall reduction of electromagnetic interference (EMI). With no windings on the rotor, BLDC motors are subjected to less centripetal forces, and because the windings are supported by the housing, they can be cooled by conduction, requiring no airflow inside the motor for cooling. This in turn means that internal components of the motor can be entirely enclosed and protected from dirt or other foreign matter. Additionally, BLDC motors exhibit reduced size and weight as compared to equivalent brushed motors. This translates to higher power to weight ratios over equivalent brushed motors. Moreover, BLDC motors are also typically slower at the same horsepower as equivalent brushed motors. Thus, BLDC motors exhibit higher power to RPM ratios as compared to brushed motors. Depending upon the configuration and implementation of the BLDC motor, it may be possible to eliminate one or more drive gears otherwise necessary to achieve certain rates of powered rotation of a drive output.

The maximum power that can be applied to a BLDC motor is exceptionally high, limited almost exclusively by heat. As will be appreciated, heat can weaken the magnets. Certain magnets typically demagnetize at temperatures greater than 100° C.

In addition, BLDC motors are often more efficient in converting electricity into mechanical power than brushed DC motors. This improvement is largely due to the absence of electrical and frictional losses due to brushes. The enhanced efficiency is greatest in the no-load and low-load region of the motor's performance curve. Under high mechanical loads, BLDC motors and high-quality brushed motors are comparable in efficiency. Increased efficiency of BLDC motors is also due at least in part to increases in pole count. Generally, increasing the number of poles causes a reduced step angle, thereby resulting in a reduced distance between magnets. Thus, in comparing a BLDC motor to a similarly sized brushed motor, the BLDC motor operates with greater efficiency.

A particularly preferred type of stator configuration used in a BLDC motor is one utilizing a segmented lamination technology. A motor using this technology features significantly reduced end turns in comparison to a traditional brushless motor, and results in increased thermal efficiency. Details as to segmented lamination stator technology are provided in an article by R. Welch, "Think Thermal to Increase Motor Efficiency," *Motion System Design*, p. 32-33, August 2009. Stators exhibiting this configuration are referred to herein as a "segmented tooth stator."

Although the preferred embodiments described herein utilize a brushless motor, it will be understood that in certain versions of the invention a conventional electric motor and one using brushes may be employed. That is, the invention includes threader devices having the noted sensors and control provisions used in conjunction with a brushed electric motor.

Thread Forming Devices

The present invention relates to systems, devices, and various methods for modifying workpieces and in particular, forming threads on pipe ends, cutting pipes, and reaming pipe ends. The systems and devices for modifying and/or performing the various operations described herein preferably use a brushless motor, all of which are described in greater detail herein. It will be understood that although the present invention is described in terms of threading, cutting, and reaming pipe ends, in no way is the invention limited to such operations. Instead, the invention is contemplated to be applicable to performing a wide array of operations on numerous workpieces and in various applications. The preferred embodiment threader device described herein is merely one example of an embodiment of the present invention.

Generally, the present invention provides a powered threader device comprising a frame assembly, an electric motor that provides a powered rotary output, a chuck assembly for retaining and rotating a workpiece about a workpiece central axis, a drive train for transmitting rotary motion from the rotary output to the chuck assembly, and a selectively positionable die assembly for forming threads in the workpiece. The powered threader device also preferably comprises electronic control provisions for controlling and monitoring rotation of the workpiece and position of the die assembly while forming threads in the workpiece.

The powered threader device of the present invention also preferably comprises one or more components or assemblies for performing additional operations. For example, in addition to forming one or more threads, typically it is also necessary or desired to cut and/or ream piping. Thus, the powered threader also comprises cutting devices and reaming devices.

Details as to the general assembly and operation of thread forming devices are provided for example in U.S. Pat. Nos. 2,768,550; 2,916,749; 1,947,874.

FIG. 1 is a perspective view of a preferred embodiment system 100 in accordance with the present invention. The preferred system 100 comprises a pipe threading device 110 and a footswitch 10 in communication with the device 110 via a footswitch cord 58. The footswitch 10 at least partially controls the operation of the device 110 and is primarily for on/off control of the device. The device 110 includes a variety of provisions for cutting, reaming, and threading pipe or other workpieces. The device 110 includes numerous features which are described in greater detail herein, and employs a brushless DC motor, also described in greater detail herein.

Figure 2:
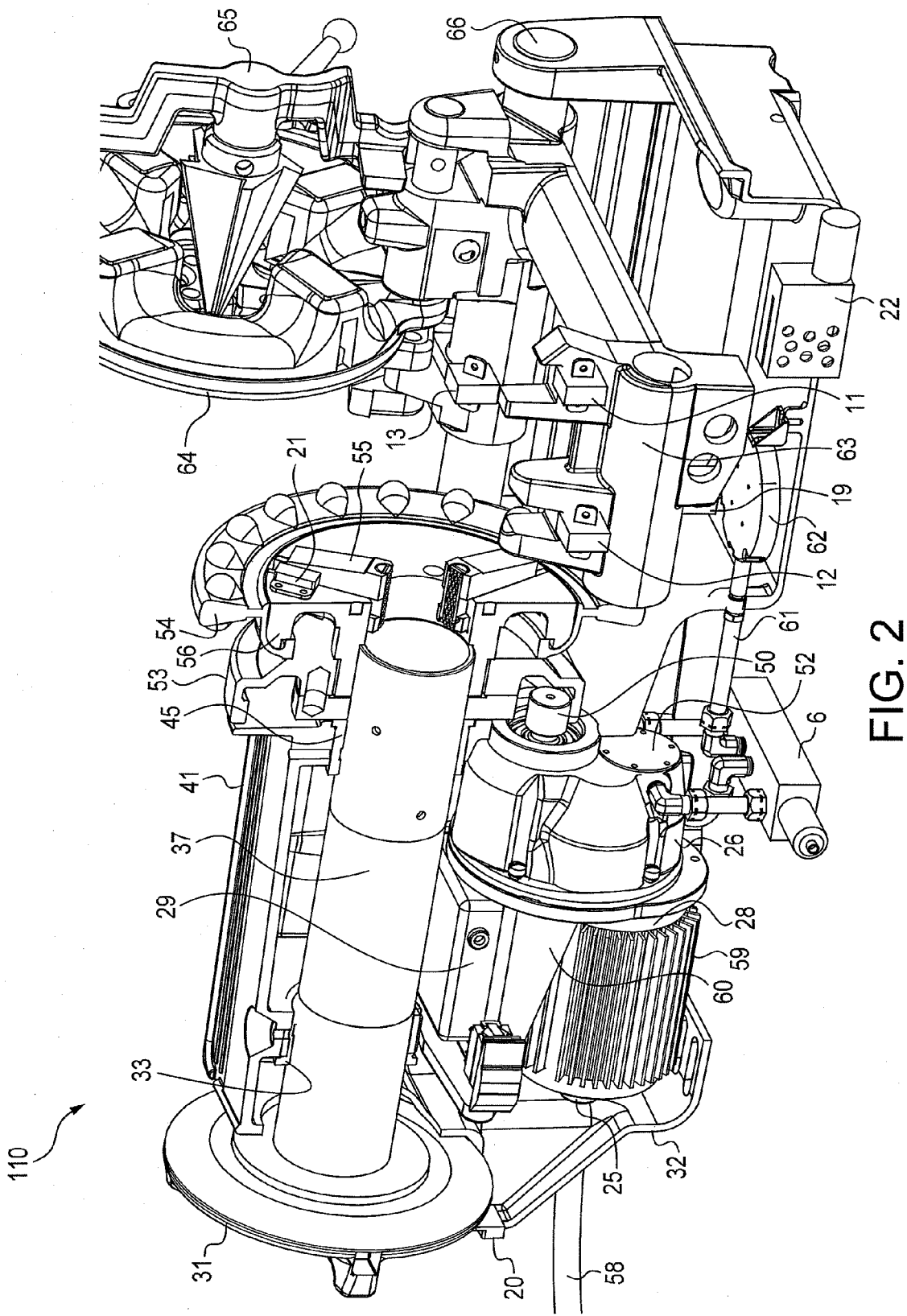
FIG. 2 is a detailed and partial cut-away view of the preferred embodiment thread forming device depicted in FIG. 1.

FIG. 2 is a detailed view of the interior of the preferred embodiment pipe threading device 110 illustrating its various components and configurations. The device 110 comprises a longitudinally extending spindle tube 37 rotatably supported by a rear spindle bearing 33 and a front spindle bearing 45. A rear chuck 31 is preferably disposed along a rearward region of the device 110. The rear chuck 31 and a forwardly disposed chuck jaw 55 serve to retain and engage a pipe or other workpiece disposed in the spindle tube 37. The spindle tube 37 receives a pipe or other workpiece to subsequently be subjected to one or more operations such as threading, cutting, and/or reaming.

The device 110 also comprises a motor 28 which is preferably a brushless DC motor. The motor 28 is operably engaged with a main drive pinion 50 via a gear box 26. Upon rotation of the motor 28, powered rotation is provided at the main drive pinion 50. Preferably positioned along the exterior of the motor 28 are one or more heatsink(s) 59. As will be appreciated, heatsink 59 promotes cooling of the motor 28 by transfer of heat from the motor to one or more heat radiating fins.

Referring further to FIG. 2, the main drive pinion 50 is engaged with a ring gear 53. The ring gear 53 is located near a handwheel 54 preferably disposed immediately forwardly adjacent to the ring gear 53. The ring gear 53 is engaged with the spindle tube 37. The chuck body 56 is engaged with the chuck jaw 55. The handwheel 54 rotates about the spindle tube 37 and a chuck body 56 shown in FIG. 5 so that the jaws can be moved radially into position using a scroll 57 (see FIG. 5). The chuck jaw 55 is adjusted to engage a pipe disposed in the spindle tube 37. Upon tightening the chuck jaw 55 about a pipe, the pipe is rotated about its longitudinal axis and within the spindle tube 37 by the motor 28 rotating the ring gear 53 and thus the chuck body 56, the handwheel 54 and the chuck jaw 55.

Referring further to FIG. 2, device 110 also preferably comprises a linearly displaceable carriage 63 generally supported on one or more carriage rails 66. The carriage 63 includes mounting provisions for supporting a reamer sensor 11, a die sensor 12, and a cutter sensor 13. Disposed generally above and co-planar with the die sensor 12, is a die head 64. The cutter sensor 13 is co-planar with a cutter 67 (see FIG. 3). The reamer sensor 11 is co-planar with a reamer 65 when in a "down" position. The die head 64 is supported on or by the carriage 63. Upon linear movement of the carriage 63, the die head 64 is also linearly displaced. As will be appreciated, the die head 64 is selectively positioned along a desired region of a pipe or other workpiece during a thread forming operation. The primary direction of movement of the die head 64 during a thread forming operation is parallel or at least substantially so, to the axis of rotation of the workpiece. Thus, as the workpiece is rotated, linear movement of the die head 64 alongside the workpiece, enables the formation of a helical thread.

With continued reference to FIG. 2, the device 110 also comprises a hydraulic pressure system and/or lubrication system to one or more components of the device. For example, an oil level sensor 22 is provided in the system and is positioned within the sump to detect the oil level therein. One or more oil intake screens 62 are provided in communication with oil lines 61. Also provided in communication with one or more oil flow lines 61 are solenoid valves 6 which selectively govern oil flow to components of the device 110. For example, the solenoid valves 6 govern flow of oil to a positive displacement pumping unit or gerotor 52. One or more temperature sensors are provided to provide information as to oil temperature.

The device 110 comprises a frame and/or base 41, a rear cover 32, and associated support and enclosure members, such as one or more motor mount brackets 60 for supporting and retaining the motor 28.

Device 110 also preferably includes control provisions, memory provisions, numerous sensors, electronic components, and associated items such as an encoder 25 typically located along a rearward region of the motor 28. The encoder 25 provides information concerning rotor position and speed feedback. A control enclosure 29 preferably houses the electronics and memory provisions governing the operation of the device 110 and/or the motor 28. A chuck position sensor 21 may be provided in association with the chuck jaw 55 to provide an indication as to the position of the chuck jaw 55 and/or the presence of a workpiece. Similarly, a rear chuck sensor 20 may be provided in association with the rear chuck 31 to provide an indication as to the position of the rear chuck 31 and/or the presence of a workpiece. A carriage position sensor 19 is provided to provide information as to the position and/or location of the carriage 63.

Figure 3:
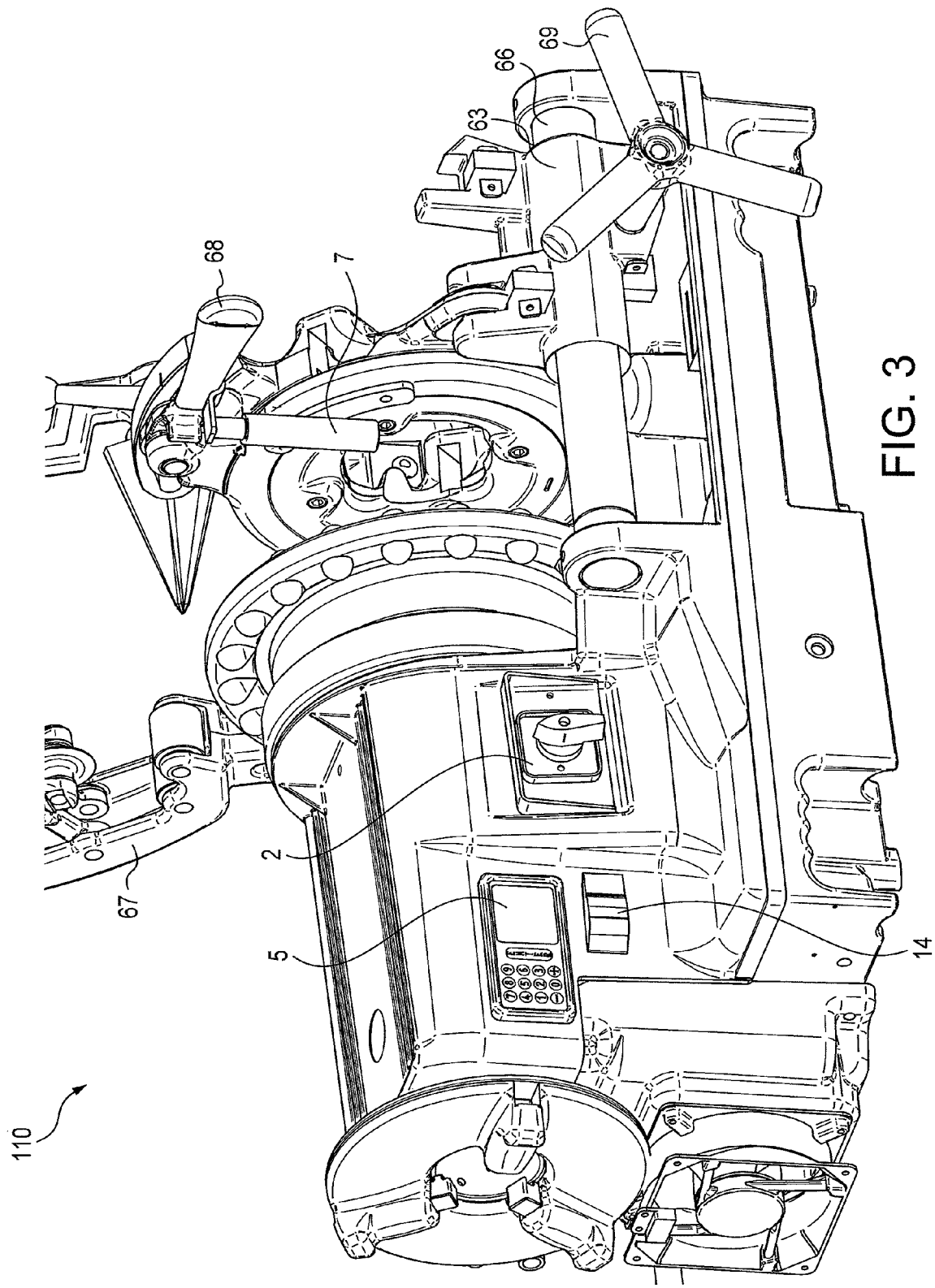
FIG. 3 is another detailed view of the preferred embodiment thread forming device depicted in FIG. 1.

The device 110 may also include a selectively positionable and adjustable reamer assembly 65, preferably located along a frontward region of the device 110. As will be appreciated, the reamer assembly 65 which is disposed on the carriage 63, is urged into an open end of a pipe or conduit to remove burrs, filings, or other debris from the interior and specifically along an inner edge of the open end pipe face, by moving the carriage. Specifically, the carriage 63 is manually and selectively positioned by turning a carriage handwheel 69 (FIG. 3). As will be understood by reference to FIG. 2, a reamer arm can be selectively raised or lowered to align the reamer 65 with the center of a pipe when disposed in the spindle tube 37.

FIG. 3 is another perspective view of the device 110 further illustrating various components visible or otherwise accessible along the exterior of the device 110. A die release 7 and an associated die release lever 68 are provided to release engagement of a die. The die head 64 (see FIG. 2) is in the down position and remains around the pipe and can pass over the pipe once the dies are released. The carriage wheel 69 is provided to selectively and manually position the carriage 63, such as along one or more carriage rails 66.

The device 110 may also comprise a selectively positionable and adjustable cutter assembly 67 for performing one or more cutting operations of a pipe. As will be appreciated, the cutter assembly 67 is used to perform one or more cutting operations on a pipe, conduit, or other workpiece. Typically, the cuts are taken through a plane that extends transversely or substantially so, to the axis of rotation of the workpiece.

Referring further to FIG. 3, preferably located along an exterior region of the device 110 is a power switch 2 for controlling forward or reverse direction of rotation. The power switch 2 can be in the form of a key having mechanical and/or electronic provisions for interlocking operation of the device 110. Similarly, one or more toggle switches 14 are provided, which can be configured so as to control the operation of one or more components of the device 110.

Also provided along an exterior region of the device 110 is a keypad and/or display monitor 5. As will be appreciated, the keypad and display monitor serve as an operator interface to receive one or more commands, inputs, or operational selections. Instructions and/or data can be entered via the keys or by a touchscreen. The display monitor serves to provide visual indication or information display of nearly any parameter associated with the device 110, its operation, and/or operations involving modifying pipe ends or other workpieces.

Figure 4:
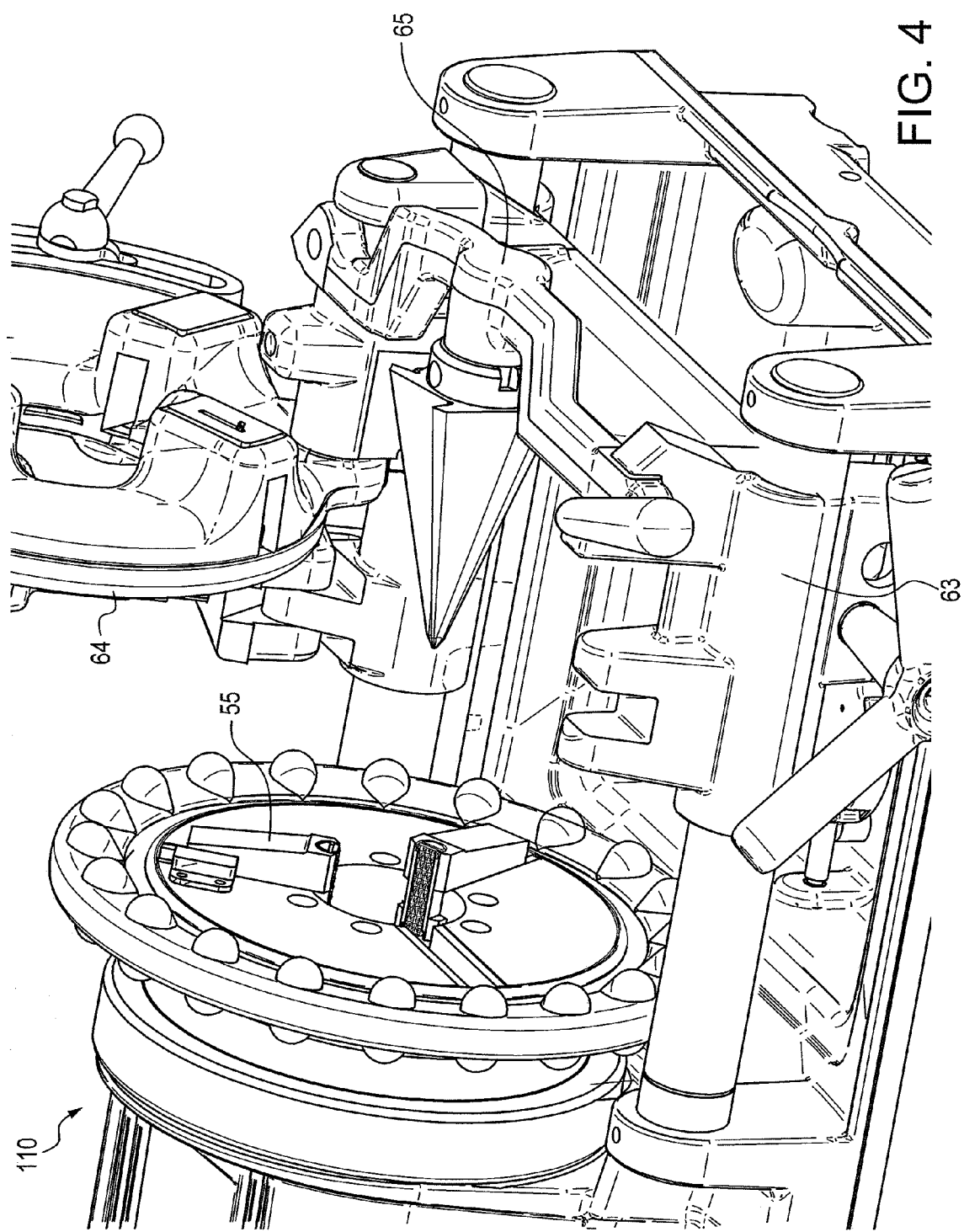
FIG. 4 is yet another detailed view of a front region of the preferred embodiment thread forming device shown in FIG. 1.

FIG. 4 illustrates yet another detailed perspective view of a region of the device 110 at which various operations are performed upon a pipe or other workpiece. FIG. 4 reveals additional details of a preferred reamer 65 (shown in the down position) and a preferred die head 64, both supported on the selectively positionable carriage 63. As evident in FIG. 4, the reamer 65 is generally aligned with or oriented to be parallel with the axis of rotation of a workpiece (not shown) clamped between the chuck jaw 55.

Figure 5:
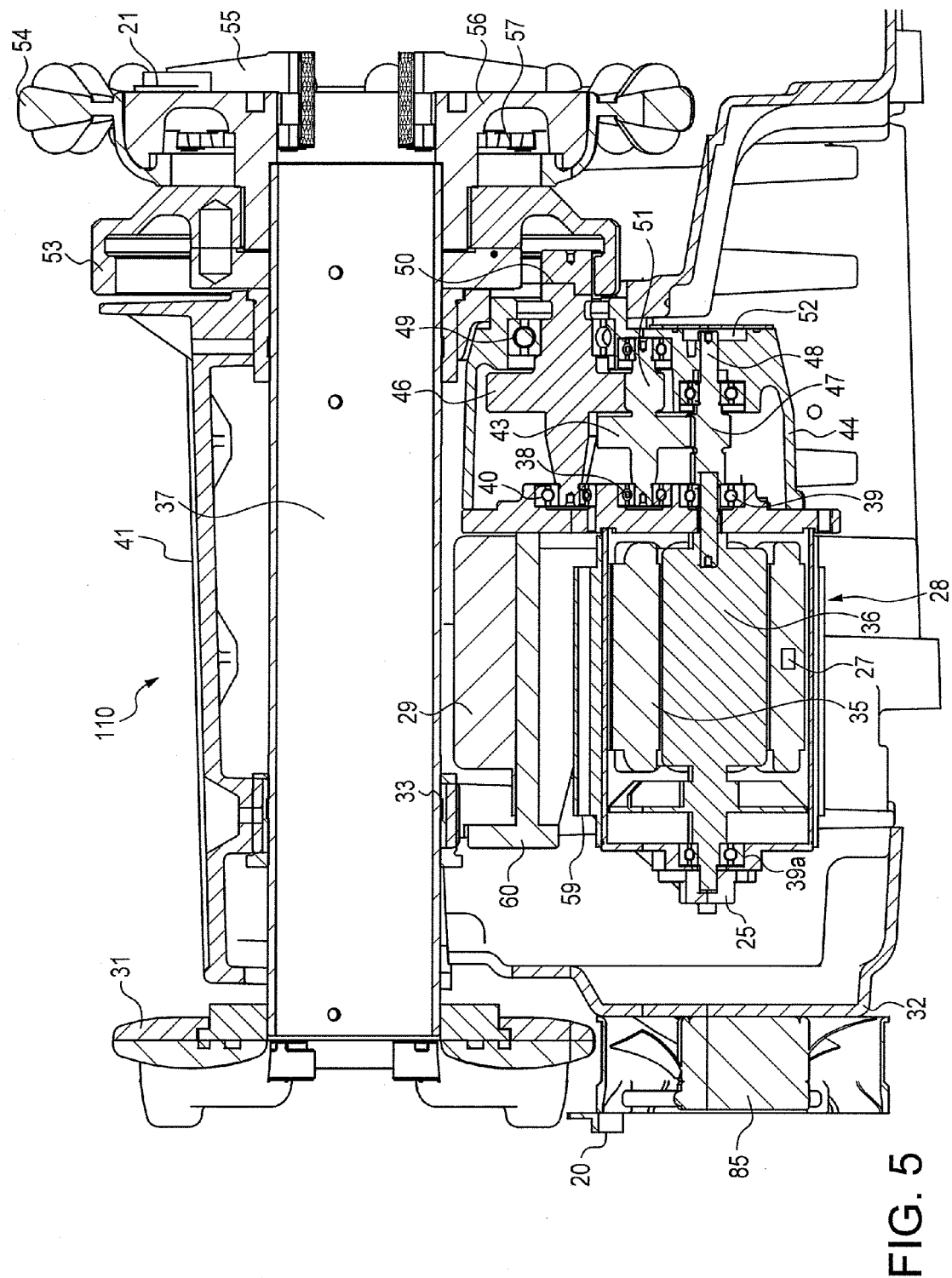
FIG. 5 is a full cross sectional side elevational view of the preferred thread forming device of FIG. 1.

FIG. 5 is another view of the preferred embodiment device 110 revealing additional details of a drive train for transferring power from the motor 28 to the ring gear 53, and additional details of other components associated with the device 110. The motor 28 is preferably in the form of a brushless DC motor having a rotor 36 and an associated stator 35 generally extending about the centrally disposed rotor 36. A motor temperature sensor 27 is preferably provided to provide temperature measurements to an on-board control or monitoring system. An internal fan or cooling assembly can be included in association with the motor 28. Optionally and preferably, an external motor fan 85 is used provided to direct air past the various motor components and provide additional cooling thereof. Generally, the optional supplemental fan 85 is operated or triggered by machine startup or high temperature conditions.

Figure 6:
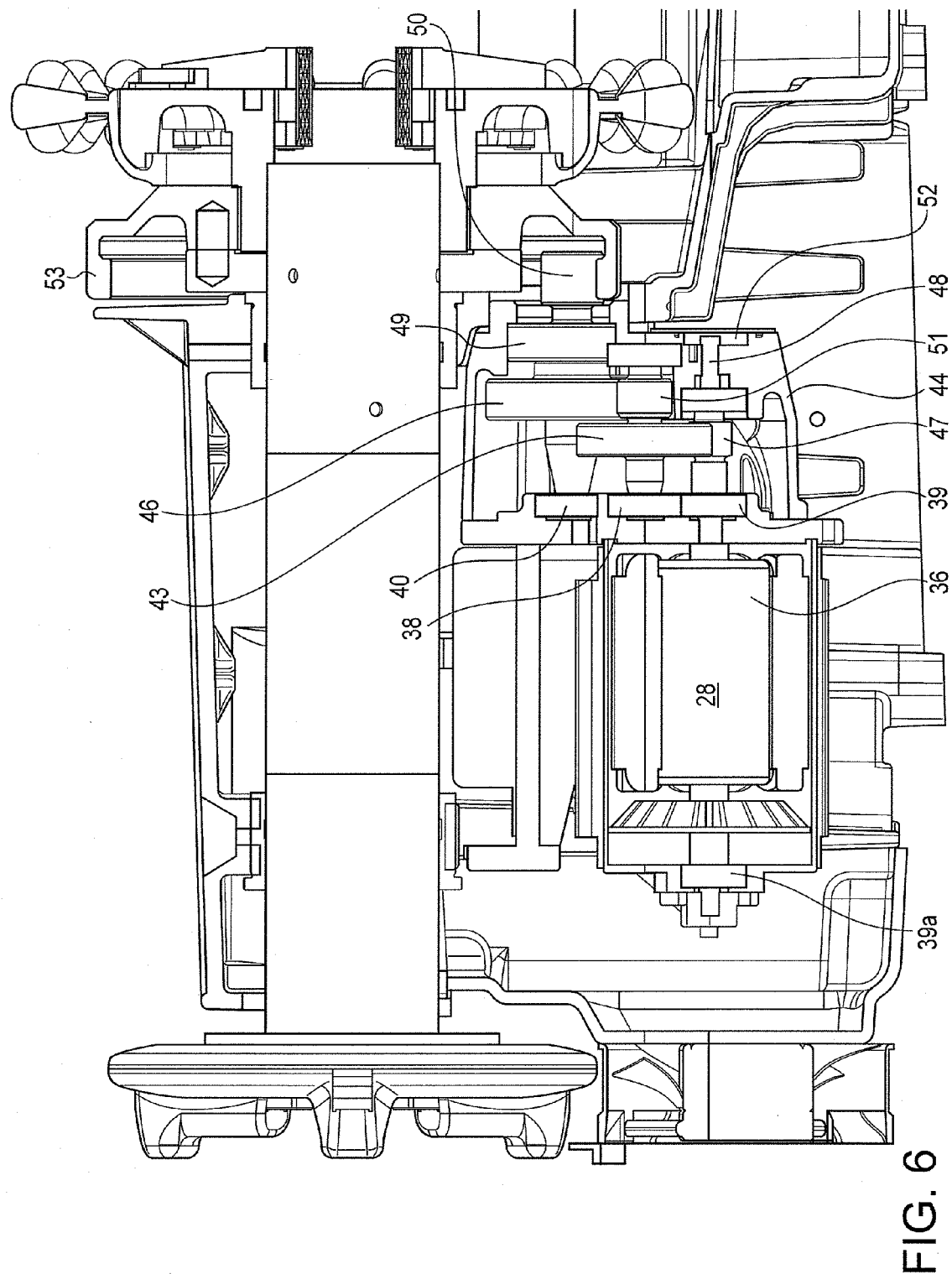
FIG. 6 is a partial cross section of the preferred embodiment thread forming device depicted in FIG. 1 showing a preferred drive and gear assembly.

Referring to FIGS. 5 and 6, the rotor 36 and a rotor shaft 48 are rotatably supported by rotor stage bearings 39 and 39a. The rotor shaft 48 transmits rotational power from the motor 28 to a positive displacement pump or gerotor 52 and a rotor pinion 47. The rotor pinion 47 and the gerotor 52 are on the same shaft. A first stage helical gear 43 is operably engaged with the rotor shaft 48 by the first gear 43 meshing with the rotor pinion 47. The first stage helical gear 43 is rotatably supported by first gear stage bearings 38. The gear 43 and a second gear 51 are on the same shaft. The second gear 51 meshes with a main drive spur gear 46. The main drive spur gear 46 transmits rotational power to the ring gear 53 via a main drive pinion 50. The spur gear 46 and main drive pinion 50 are on the same shaft. The spur gear 46 and the main drive pinion 50 are rotatably supported by main drive stage bearings 40 and 49. And, the main drive pinion 50 meshes with the ring gear 53. The entire assembly of gears is preferably enclosed by a gear case 44.

Various components are preferably positioned along a frontward region of the device 110. For example, the chuck position sensor 21, the chuck jaw 55, the chuck body 56, and the scroll plate 57 are as shown in FIG. 5.

The preferred embodiment device 110 uses a relatively sophisticated array of sensors, operator inputs, and determined states or conditions to provide an extensive amount of information to the microprocessor-based control system of the device. Table 1 set forth below is a listing of various preferred inputs that are all or at least partially used in the operation of the preferred device 110.

TABLE 1

| Input | Ref. Nos. | Value | Unit | Sensor(s)/ Hardware | Use/Output |
|---|---|---|---|---|---|
| Information Providing Inputs | | | | | |
| Cutter Position | 13, 67 | Up or Down | N/A | optical, hall effect, microswitch, potentiometer | Change motor characteristics when cutter is down. Run motor at the optimal speed for cutting (high speed cutting, maximum of 70 RPM). |
| Reamer Position | 11, 65 | Up or Down | N/A | optical, hall effect, microswitch | Change motor characteristics if reamer is in use. Run motor at the optimal speed for reaming (high speed reaming, maximum of 70 RPM). Use feedback from chuck or cutter sensors to determine the correct speed for the pipe diameter. Store a record of the ream and pipe size in the control's memory (non-volatile). |
| Chuck Position | 21, 54, 55, 56, 57 | ⅛-2 | inches | linear encoder | Track the movement of the chuck jaw inserts. Determine the pipe size when the machine is running and other machine sensors confirm that the machine is in use (cutting, reaming, thread). Record pipe size in memory. |
| Chuck Status | 21 | Clamped or Free | N/A | strain gauge, pressure sensor | Determine if pipe is secured. Stop machine and alert user if pipe is not secure when the motor is on or the user tries to start the unit. |
| Carriage position | 19, 63, 66 | 0-12 | inches | linear encoder | Track movement of carriage relative to rail. Used to determine the thread length and identify the type of thread based on feed (BSPT, NPT, UNC etc.). Used to trigger die release mechanism to ensure the proper thread length is cut. |

TABLE 1-continued

Information Providing Inputs

| Input | Ref. Nos. | Value | Unit | Sensor(s)/Hardware | Use/Output |
|---|---|---|---|---|---|
| Die Head Status | 12, 64 | Threading or Idle (force threshold) | lbf | force sensor under the die head rest (to determine is torque is applied) | Sense force on resting position of the die head. Store a record of the thread type and pipe size in the control's memory (non-volatile). |
| Motor Current | 24 | 0-6 Amps per Phase | Amps | shunt resistor | Used to determine the operation in progress (thread, cut, or ream). Uses volatile memory to track current over time period and recognize the "signature" of the operation. Result (i.e. type of operation) is recorded in non-volatile memory. The operation may also be known based on the additional information from the cutter, reamer, and die head sensors, but it is not required. Used to record baseline thread current information once user has all settings in place. Diagnose high torque conditions (chaser wear) or motor failures based on baseline data or nominal data of the motor. Also used to alert user of preventative maintenance milestones (e.g. 1000 thread cycles). NOTE: Speed may also be determined from back EMF zero crossings. Control attempts to put winding current in phase with back EMF. |
| Motor and Control Temperature | 15, 27 | 0-110 | degrees C. | Thermistor, thermocouple | High temperature shutdown to prevent damage to the motor. (User is informed of the shutdown and the cause.) High temperature "events" are recorded in non-volatile memory and used to diagnose motor/control failures. Used to trigger start up of auxiliary fan. |
| Machine Orientation | 23 | 360 | degrees | accelerometer | Determines the position of the machine by using gravity. Turns off machine in the event it is tipped over or tilted excessively. Requires user reset before returning to normal operation. |
| Supply Voltage | internal to 29 | 100-240 V, 25-60 Hz | V, Hz | Various | Used by power supply (rectifier) for power factor correction. Record of voltage stored in non-volatile memory. |
| Motor Speed | 25 | 0-70 | RPM | Encoder | Feedback used to respond to speed demand based on sensor inputs. Calculated spindle speed (from known gear ratio) used for thread length determination. NOTE: Speed may also be determined from back EMF zero crossings. |
| Username/Password | 5 | N/A | N/A | Keypad w/Display | Stores work for a particular session along with the user's information. Allows the user to track progress and search work history using keypad. Allows user to save and recall settings. Allows owner/manager to set up "administrator" of the machine or different levels of access to the machines features. Works as security feature, security code. |
| Job Description or Number | 5 | N/A | N/A | Keypad w/Display | Stores work done on particular job. Allows multiple users to access the job history. |
| Job Data | 5 | N/A | N/A | Keypad w/Display | Allows storage of job requirements and a list of parts that must be produced or a list of tasks to complete. Allows users to sort tasks and track progress. |
| Start/Stop Buttons | 5, 14 | On/Off | N/A | Keypad w/Display or Toggle Switch | Used to turn motor on (w/soft start), and stop machine (initiates dynamic braking). |
| Forward/Reverse Button | 5, 14 | Forward/Reverse | N/A | Keypad w/Display or Toggle Switch | Changes rotation direction of the motor for left hand threading and other operations. Displays direction status. Switches solenoid valve to change direction of oil flow. |
| Pipe Length | 20 | Longer or Shorter than Spindle | N/A | hall effect, optical | Alerts user to use rear centering chuck if the pipe is longer than the spindle. Stops machine if excessive non-concentric rotation of the pipe occurs (picked up by accelerometer). |
| Oil Level | 22 | Above or Below minimum amount | N/A | oil level sensor, float | Alerts user to user to add or change oil |
| Receiver/Transmitter Signals | 8, 70, 71 | N/A | N/A | Receiver/Transmitter | Allows the user to track data from multiple machines using wireless communications. Allows user to change the settings of the control remotely using an interface PC program. Allows control features to automatically change according to the location of the machine (GPS). Allows unit to be tracked and recovered in case of theft. |
| USB Connector | 8 | N/A | N/A | Flash Drive, USB Cable | Allows user to store parameters, settings, and login information which can be recalled by the software. |

Figure 7:
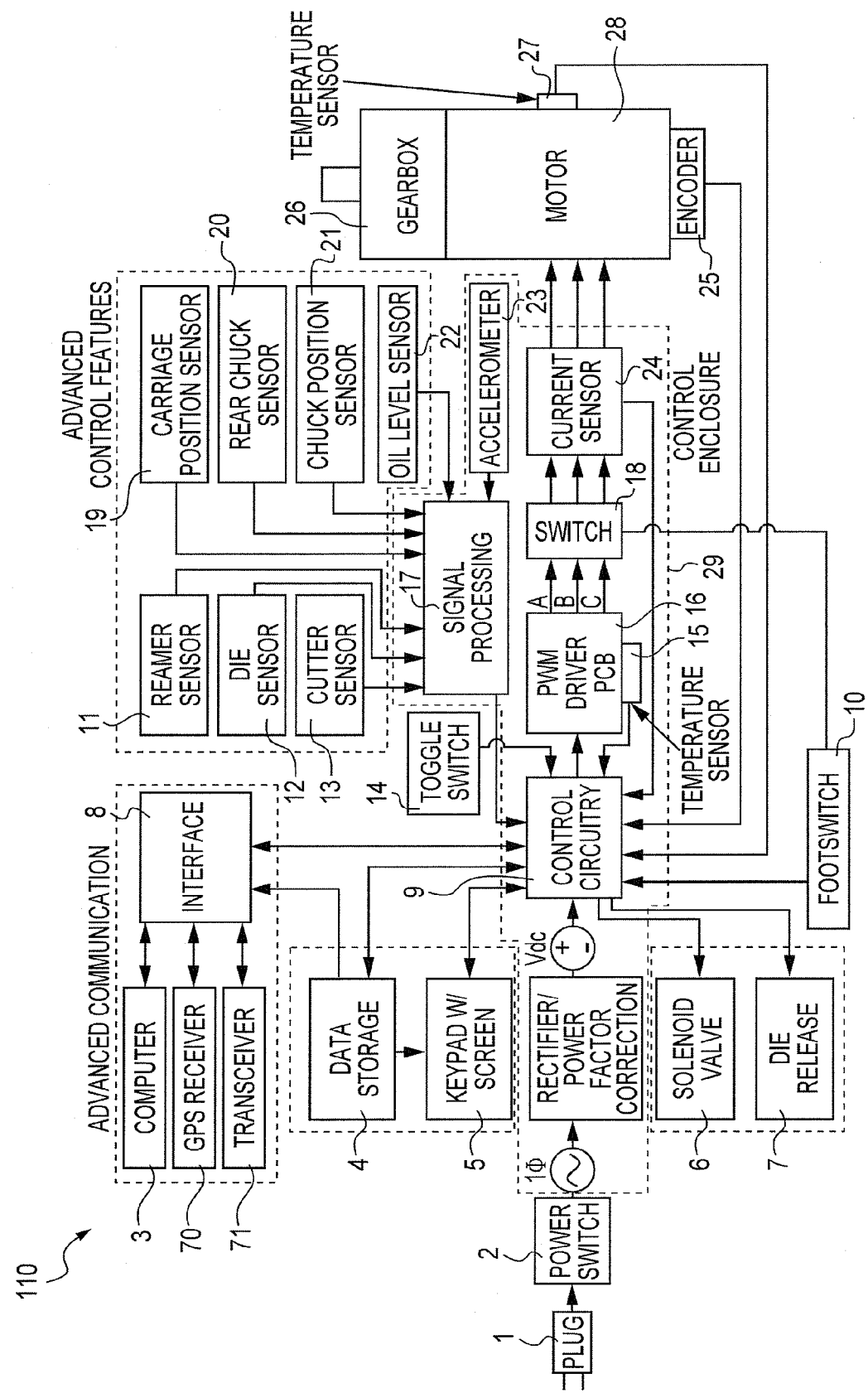
FIG. 7 is a schematic illustration of a functional configuration of the preferred embodiment thread forming device in accordance with the present invention.

FIG. 7 schematically illustrates a preferred operational or functional configuration for the preferred embodiment device 110 in accordance with the present invention. The device 110 generally includes a group of features within or associated with the control enclosure 29, another group of features generally referred to as advanced control features, and a set of features referred to as advanced communication features. It will be noted that none of the advanced control and communication features are necessary for the basic operation of the unit. The invention benefits from the efficiency and durability gains with these provisions. Each of these is described in greater detail as follows.

An electrical socket or plug 1 as known in the art and the power switch 2 establish electrical power supply to the device 110. Incoming electrical current is directed to a rectifier or power factor correction device. Controlled DC power is then supplied to various on-board electrical circuits, components, and the like. The control circuitry governs operation of one or more solenoid valves 6, the die release 7, and other components. Appropriate electronic control signals can be collected, monitored, and/or used by the control circuitry such as signals from the footswitch 10, the motor 28 and the motor temperature sensor 27, the encoder 25, a current sensor 24 and other components such as the keypad and monitor 5, memory provisions 4 for data storage, operator or external signals from a communication interface 8, outputs from one or more signal processors, outputs from toggle switches 14, and outputs from PWM driver printed circuit board component 16. As shown, a circuit board temperature sensor 15 may be provided in association with the printed circuit board driver 16. Outputs from the PWM driver circuit board are three phase wires of the motor (A, B, and C). The switch 18 is connected with the footswitch 10 to indicate that there is an electrical footswitch signal connection to the control and an additional connection to the power side. Thus, if the control were to not respond to the footswitch, the phase wires would be opened to stop motor rotation. All three phase lines would either be opened or closed. The current sensor 24 senses current in all three phases.

A wide array of advanced control features generally relating to sensors and information-providing or information-generating components are in communication with the signal processing provisions. For example, the cutter sensor 13, the die sensor 12, the reamer sensor 11, the carriage position sensor 19, the rear chuck sensor 20, the chuck position sensor 21, the oil level sensor 22, and an accelerometer 23 all preferably provide one or more outputs to the signal processing provisions 17. The accelerometer 23 can be utilized to assess a state of tipping of the device or if the device is oriented at an excessive inclination.

A wide array of advanced communication sensors and components are also preferably used to provide information to a communication interface 8. For example, a computer 3 or other microprocessor-based component is preferably in bidirectional communication with the communication interface 8. Similarly, a GPS (global positioning system) receiver 70 and a transceiver 71 can be provided and configured for bidirectional communication with the communication interface 8. The interface 8 preferably receives data from the data storage provisions 4 and is in bidirectional communication with the control circuitry 9.

Figure 8:
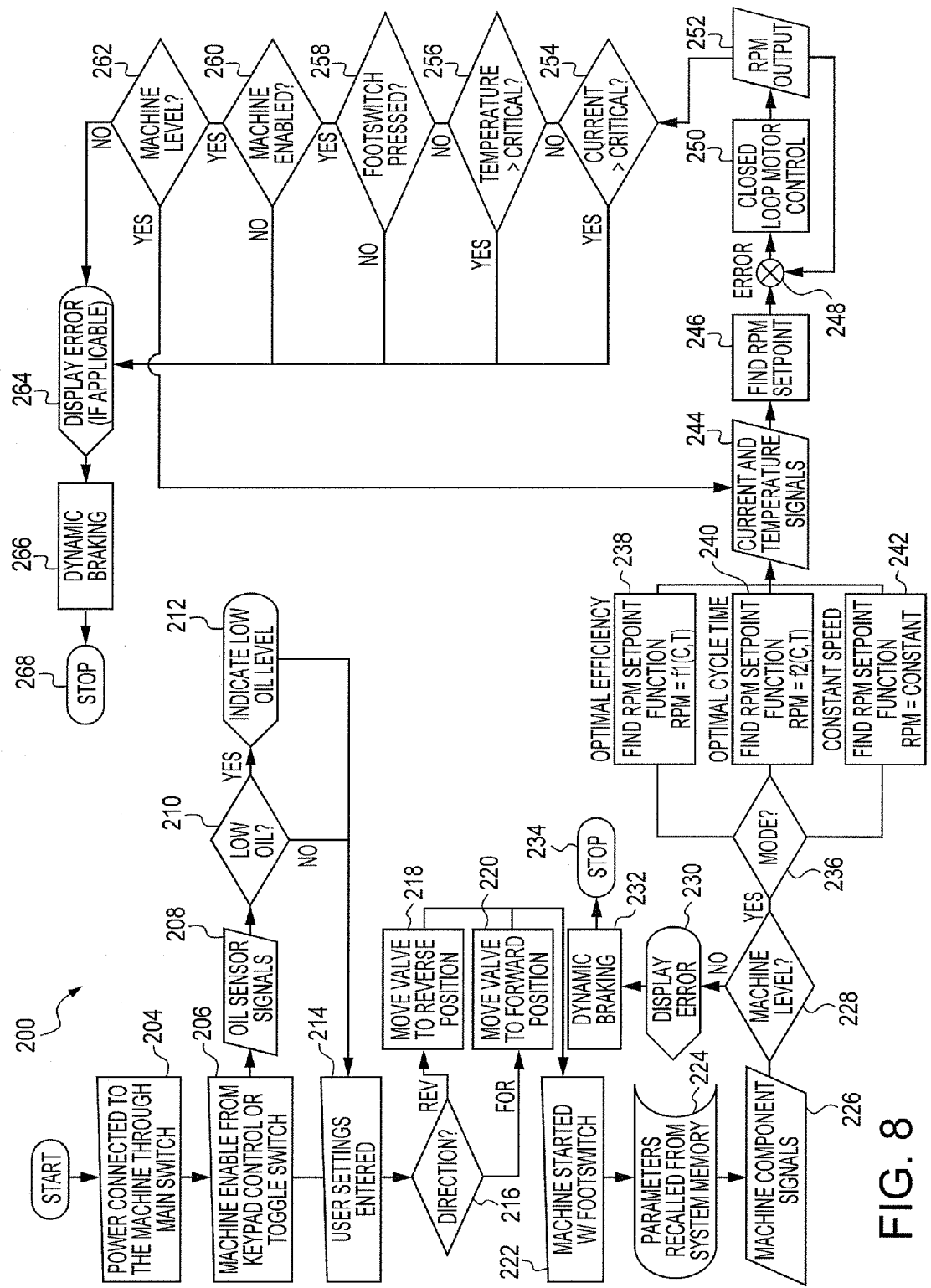
FIG. 8 is a flowchart illustrating a preferred operation sequence of the preferred embodiment thread forming device in accordance with the invention.

FIG. 8 illustrates a preferred method of operation 200 of the device 110. Upon receiving a start signal, an initialization check is made to confirm that power is connected to the device 110 through the main switch 2. This operation is depicted as 204. Next, in operation 206, the machine is enabled from the keypad controls 5 or from one or more toggle switches 14. Operation 206 is completed upon receiving appropriate signals from keypad controls 5, toggle switches 14, and main switch 2. One or more oil sensor 22 signals (see FIGS. 2 and 7) are monitored to assess whether sufficient oil levels exist within the hydraulic and/or lubrication system, and preferably that the temperature of the oil is within an acceptable range. This assessment is depicted as 208. In the event that a low oil signal is detected such as via operation 210, a low oil level indicator is activated as shown by 212. In the event that no adverse oil conditions are detected, the device 110 prompts the operator to enter any user settings or other information. This is depicted as operation 214. The method 200 preferably monitors or requests from the operator, the direction of rotation to be imparted to the pipe or workpiece. This is noted as operation 216. For operation 216, the direction is set by main switch 2 (see FIGS. 3 and 7). For reverse rotation, the device components are configured appropriately such as by moving a valve to its reverse position as shown in 218. Similarly, for forward rotation, the valve is moved to its forward position as shown in 220. Changes in valve positions direct pressurized hydraulic fluid to other components of the device 110 and may selectively re-position those components. The main function of the pump is to circulate cutting fluid, not to provide hydraulic fluid for power. It will be noted that the oil is pumped through the die head.

Further operation of the device 110 is initiated with the footswitch 10 as shown by operation 222. One or more parameters are recalled from the on-board memory provisions 4 (FIG. 7) such as indicated at operation 224. One or more machine component signals are obtained and/or monitored, such as depicted at operation 226. These signals are typically from the cutter sensor 13, the reamer sensor 11, the die sensor 12, the accelerometer 23, etc. (see FIGS. 2 and 7). A check is made to confirm that the device 110 is level, as noted by 228. In the event that the device is not level, a display error is indicated at the operator interface 5, 8 (see FIGS. 3 and 7), indicated by operation 230. Additionally, dynamic braking is applied, shown at 232, to stop further rotation or other operations, as depicted at 234. In the event that a proper level signal is detected, a mode selection is made at 236. Mode selection is completed from user settings stored in the system and user entered settings 214, 224. These modes are not selected by the user at this time. At this juncture, one or more modes of operation are used for subsequent operation or control of operation of the device 110. For example, a mode 238 for operation of the device 110 can be selected with a goal of optimizing overall efficiency. Alternatively, a goal of optimizing cycle time via mode 240 can be selected. Yet another mode may pertain to utilizing a constant speed, depicted as 242. One or more of these modes are then used in conjunction with signals associated with electrical and temperature signals, to arrive at a target RPM setpoint as noted at operations 244 and 246. One or more control algorithms generally indicated via items 248 and 250 produce output phase voltages 252 that are used to govern the rotational velocity of the motor 28. For example, known PID control loops can be used for controlling motor speed.

During operation of the motor 28, one or more operational parameters or sensors are preferably monitored, such as indicated by items 254, 256, 258, 260, and 262. Specifically, signal 254 conveys information as to whether the current at the motor 28 is at a critical or other unsatisfactory state. The signal 256 conveys information as to whether temperature at one or more locations in the device 110 is excessively high. The signal 258 conveys information as to whether the footswitch 10 is pressed or otherwise activated to confirm the presence of an operator at the footswitch 10 and/or the device 110. The signal 260 conveys information as to whether the device 110 is sufficiently enabled to continue with further operation. Operation 260 is determined from switches 2 and 14 or keypad 5. And, the signal 262 conveys information as to the horizontal inclination or orientation of the device 110. In the event that one or more fault or error signals are detected, an error message or indication is made at 264, and dynamic braking 266 is applied to the motor 28 to effect a stop 268.

In addition to the basic operation flowchart of FIG. 8, in a preferred embodiment, one or more simultaneous operations or control sequences are also performed during device operation. These operations are generally performed in parallel with the overall device operation. FIGS. 9-12, 13, 15, and 16 detail each of these preferred simultaneous operations. As described in greater detail herein, the threader device also provides various control provisions and monitoring provisions for cutting and/or reaming components also provided in association with the threader device.

Figure 9:
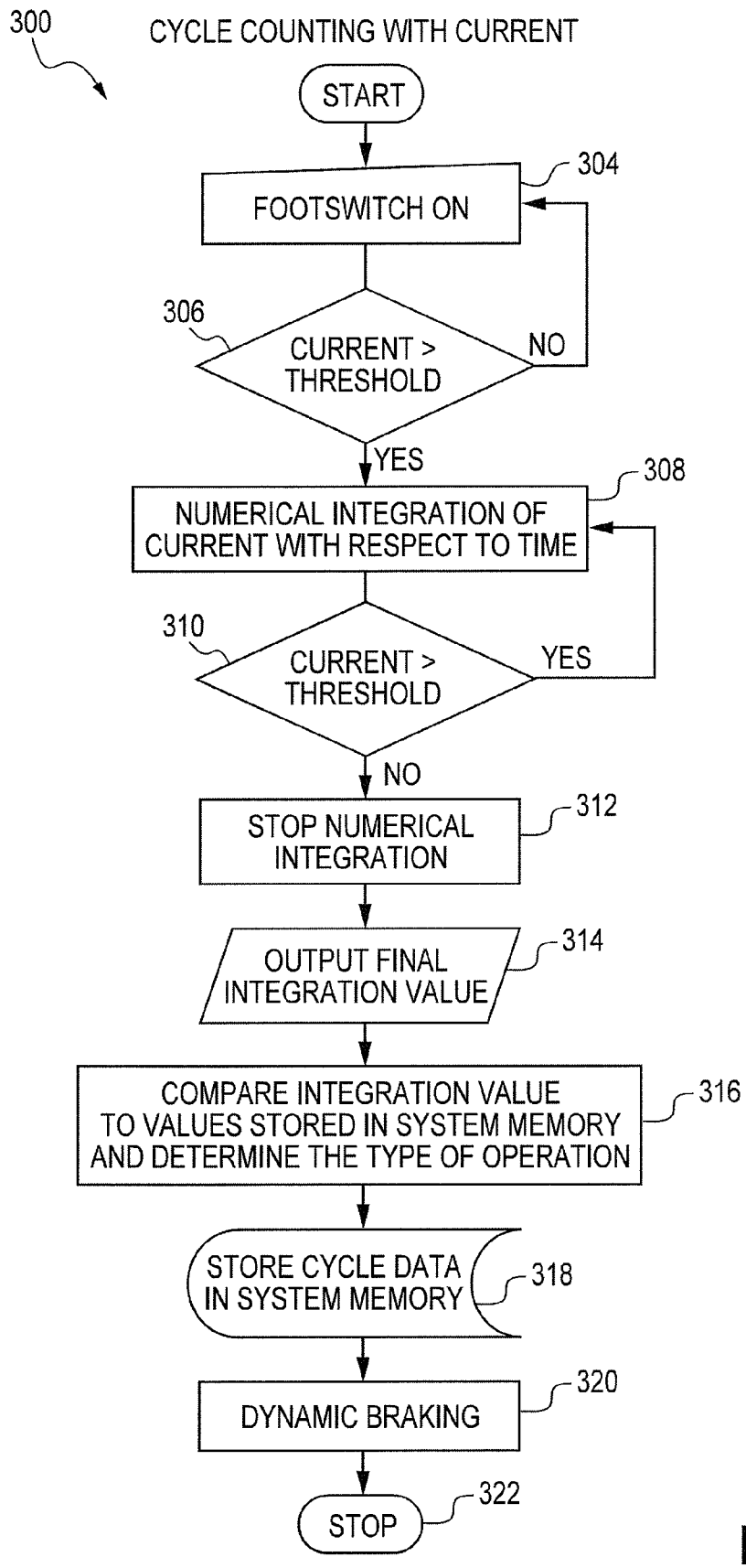
FIG. 9 is a flowchart illustrating another aspect of a simultaneous preferred operation of the preferred embodiment thread forming device.

FIG. 9 is a flowchart illustrating a preferred method 300 for cycle counting or monitoring utilizing electrical current consumption. The method is initiated via start and receiving a footswitch activation signal generally designated as 304. Preferably, this activates the threader device such that the device is placed in electrical communication with a source of electrical power. The method 300 remains in a hold state if the incoming current is less than a threshold value, which occurs unless the operation is started. This evaluation is noted as item 306. A numerical integration of current consumption as a function of time is performed as indicated by 308. So long as the instantaneous current is greater than the threshold value, the integration calculation continues. However, the integration is stopped if the instantaneous current value is less than the threshold value. These operations are depicted as 310 and 312. Once a final integration current value is obtained, that value can be output or displayed, as depicted by 314. Additional operations or analyses can be performed using the final integration values. For example, by comparing the integration value to benchmark or archived values stored in the system memory, the type of operation may be determined, as indicated by 316. An example of this is described later herein in conjunction with FIG. 13. Preferably, the incoming electrical current is compared to a threshold value. If the incoming current is less than the threshold value, the method is placed in a hold state. If the incoming current is greater than the threshold value, the method proceeds to an integration operation. The integration operation involves integrating electrical current consumed by the threader device as a function of time during at least a portion of operation of the threader device to thereby produce an integration value. The integration value is compared to at least one benchmark or archived value stored in electronic memory of the threader device. The benchmark or archived value is preferably one or more of a value representative of a cutting operation, a value representative of a reaming operation, and a value representative of a threading operation. The type of operation which the threader device performed or in certain instances, is currently performing, can be determined by assessing which of the benchmark or archived values most closely correspond to the integration value. The integration value is preferably stored in one or more memory provisions or otherwise archived, as shown in 318. Upon reaching a final integration value and/or receiving a stop signal, the method 300 may initiate dynamic braking 320 of the motor to effect a stop 322.

Figure 10:
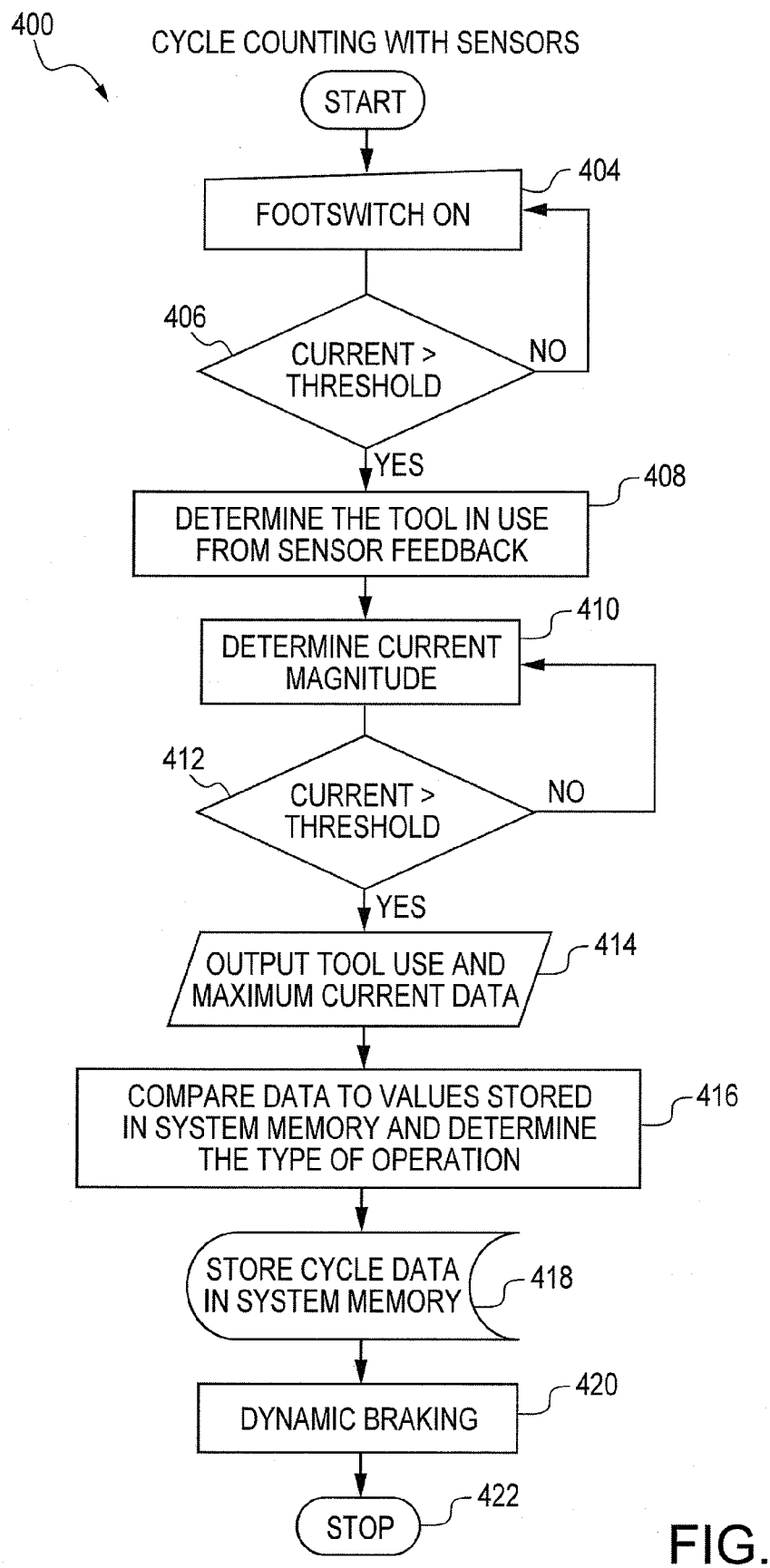
FIG. 10 is a flowchart illustrating another aspect of the simultaneous preferred operation of the preferred embodiment thread forming device.

FIG. 10 is a flowchart illustrating another preferred method 400 for cycle counting or monitoring using one or more sensors. Upon starting the sequence and receiving a signal indicating activation of the footswitch, e.g. 404, the current consumption is monitored and compared against a threshold value, as shown by 406. Once the current value is greater than the threshold value, a determination is made whether the one or more particular tools are in use. Once confirmation is made of tool use via the appropriate sensor(s), e.g. 408, the current magnitude is assessed at 410. The instantaneous current draw is compared to a threshold value, e.g. 412. So long as the instantaneous current value is greater than the threshold value, information is output as to tool use and maximum current draw, 414. This information is compared to benchmark and/or archived values stored in memory provisions to determine the particular type of operation, 416. Preferably, the incoming electrical current is compared to a threshold value. If the incoming current is less than the threshold value, the method is placed in a hold state. If the incoming current is greater than the threshold value, the method proceeds to a comparing operation. The comparing operation involves comparing the incoming electrical current to a first threshold value, whereby if the incoming current is less than the first threshold value the method is placed in a hold state. If the incoming current is greater than the threshold value, the method proceeds to a sensor monitoring operation. In this operation, at least one sensor output of the threader device is monitored. The sensor can be a cutter sensor, a reamer sensor, and/or a thread or die sensor. The magnitude of instantaneous electrical current consumed is compared to a second threshold value. If the instantaneous current magnitude is greater than the second threshold value, the method proceeds to another comparing operation. Next, an output(s) of the at least one sensor and the instantaneous electrical current consumed by the threader are compared to at least one set of benchmarks or archived values, which may be values representative of a cutting operation, values representative of a reaming operation, and values representative of a threading operation. The type of operation performed by the threader device is identified by determining which of the benchmark or archived values most closely correspond to the output of the at least one sensor and the instantaneous electrical current. Again, an example of this is described herein in conjunction with FIG. 13. Cycle data and other parameters are preferably stored in on-board memory provisions, 418. Upon completing the operation, dynamic braking of the motor is initiated, 420 to effect a stop 422.

Figure 13:
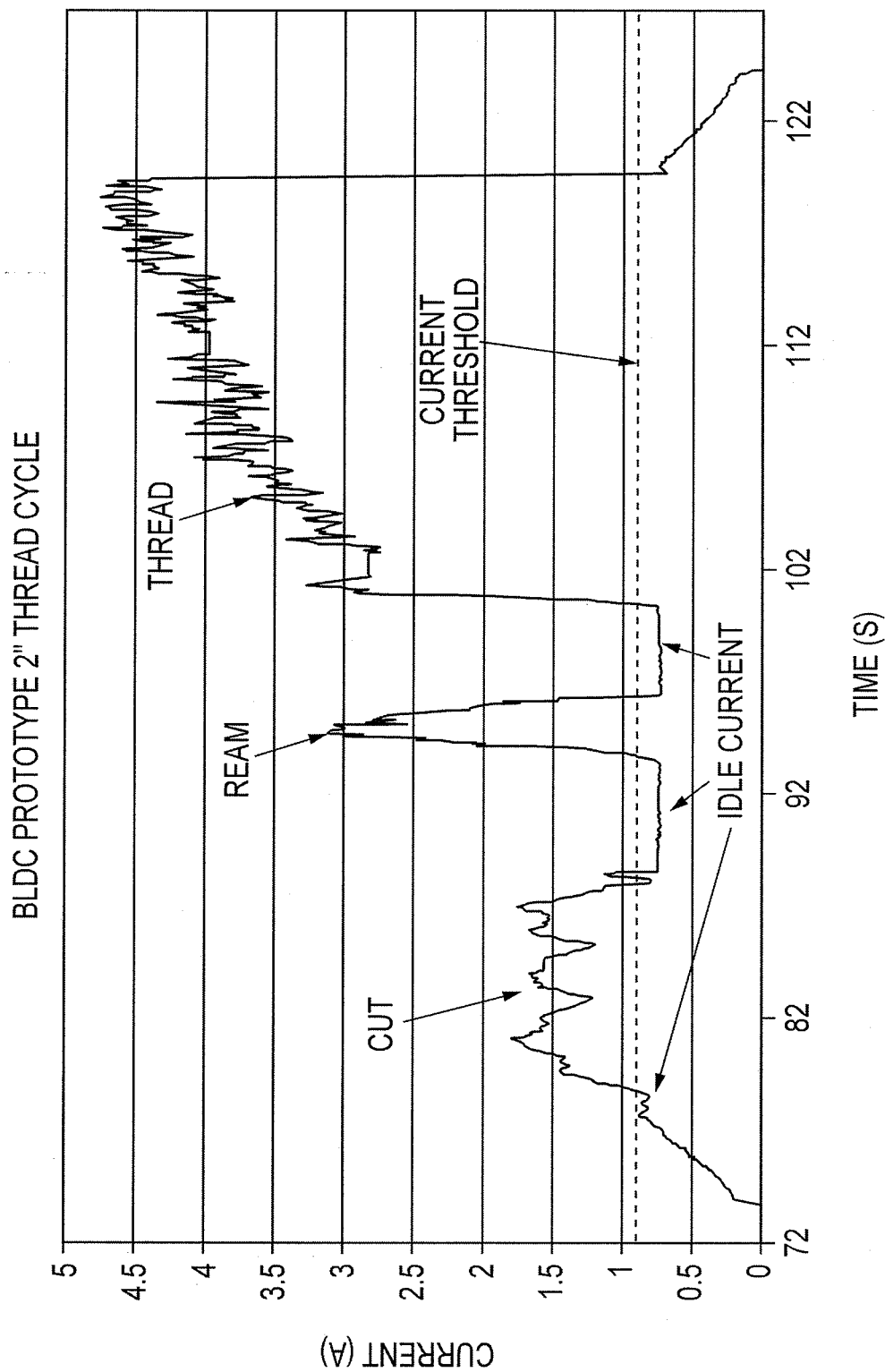
FIG. 13 is a graph of electrical current over time illustrating various profiles of current draw for three operations using the preferred embodiment thread forming device.

Generally, the current integration and the current magnitude are monitored in the operations depicted in FIGS. 9 and 10 as long as the instantaneous current exceeds a threshold value such as depicted in FIG. 13, which thereby indicates that some type of operation is being performed. Once the current falls below the threshold, the integration value or maximum current is compared to benchmarks.

Figure 11:
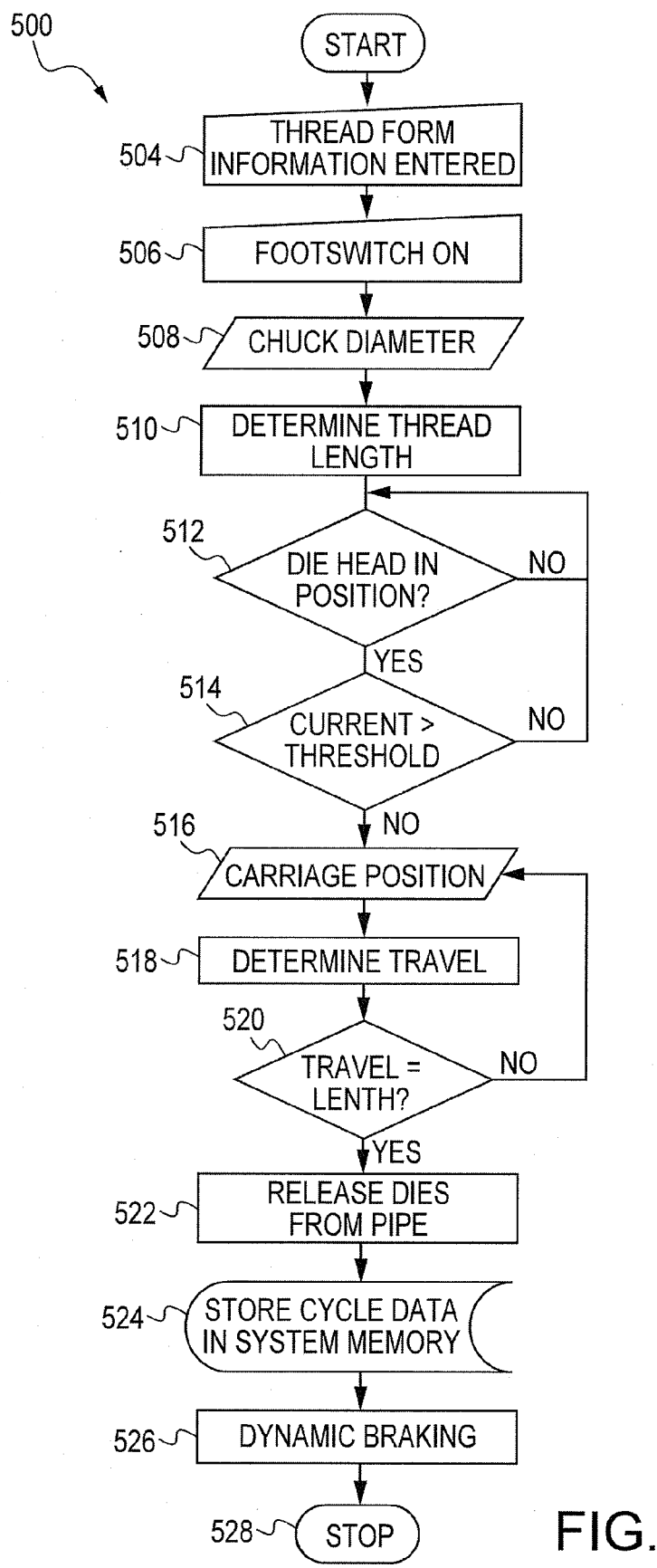
FIG. 11 is a flowchart illustrating yet another aspect of the simultaneous preferred operation of the preferred embodiment thread forming device.

FIG. 11 is a flowchart of a preferred embodiment method 500 for performing a threading operation on a pipe end using the preferred device 110 in accordance with the present invention. Upon securing a pipe in the device and initiating the method 500 by receipt of a start signal, the method obtains parameters 504 for the threading operation such as thread forms to be used. Such information is preferably stored in on-board memory provisions 4 (FIG. 7). That information may also be entered by the operator or from another source. The method 500 is enabled or otherwise proceeds upon detection of one or more signals from the footswitch 10, shown as operation 506. Next, upon sensing the chuck diameter, via operation 508, the target thread length is then determined at 510. Checks are made to confirm that the die head is appropriately positioned, via operation 512, and electrical current levels exceed a predetermined threshold value, as in operation 514. Upon confirmation of appropriate conditions, it is known that a threading operation is occurring. In the event that either of these conditions 512 and 514 is not met, the method 500 is suspended and/or placed into a pause mode until operator intervention occurs. In the event that conditions 512 and 514 are satisfied, and as the threading operation is underway, measurement of carriage position 516 is made. As will be appreciated, a threading die or tool is contacted and engaged with the pipe or workpiece as the pipe is rotated. The threading die or tool, preferably supported on a carriage, is linearly displaced alongside the rotating pipe to thereby form a helical thread. During the threading operation, the carriage travel is periodically checked and compared to the initial measurement. These actions are denoted as 518 and 520. Threading continues until the carriage travel equals the previously determined target thread length from operation 510. Upon reaching such state, the threading operation is concluded and the dies are released from the pipe (released by die release 7 shown in FIG. 3), as indicated at operation 522. Relevant parameters, data, and other information associated with the threading operation are stored in on-board memory provisions 4 (FIG. 7) on the device, indicated via operation 524. A dynamic braking procedure 526 can be initiated upon the motor to thereby effect a stop 528.

Figure 12:
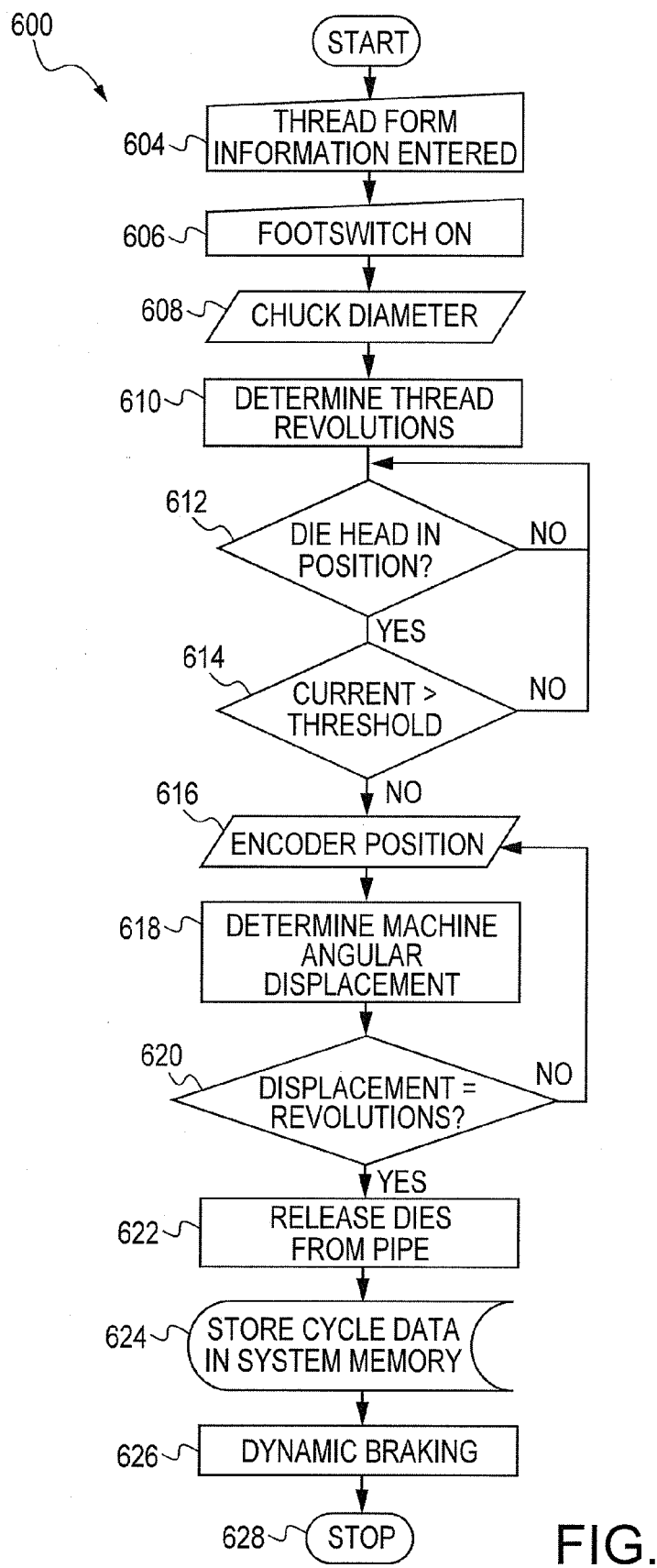
FIG. 12 is a flowchart illustrating still further another aspect of the simultaneous preferred operation of the preferred embodiment thread forming device.

FIG. 12 illustrates another preferred embodiment method 600 for performing a threading operation on a pipe or other workpiece using the preferred embodiment device 110 in accordance with the invention. The preferred method 600 parallels the previously described method 500 except the method 600 monitors progress of a threading operation by analyzing angular displacement of the motor 28 as opposed to linear displacement of the carriage 63. Operations 604, 606, 608, 612, 614, 622, 624, 626, and 628 generally correspond to previously described operations 504, 506, 508, 512, 514, 522, 524, 526, and 528 noted in association with FIG. 11. Specifically, the position of one or more encoders 25 (FIGS. 5 and 7) on the motor shaft (or any corresponding rotary component in engagement therewith) are monitored to determine cumulative rotations. That total is compared to a target total number of rotations as determined by thread parameters at 610. So long as a current total of rotations is less than the target total necessary to complete a threading operation, thread formation by the device continues. Once the monitored number of rotations is equal to (or exceeds) the targeted number of rotations for threading, the method 600 proceeds to conclusion. This determination is generally indicated at operations 616, 618, and 620.

FIG. 13 is a graph illustrating current consumption characteristics for three different operations using the device. Specifically, current draws are depicted for cutting, reaming, and threading operations. As evident in FIG. 13, each operation can be characterized by a particular shape or profile noted on the graph. These shapes or profiles serve as "signatures" of the respective operation. Thus, it will be appreciated that software algorithms can be readily used to identify a particular operation by analyzing a current draw profile. Furthermore, one or more "ideal" current draw profiles can be stored, and against which, present current draw profiles are then compared to provide real-time indication as to the progress and state of an operation.

Figure 14:
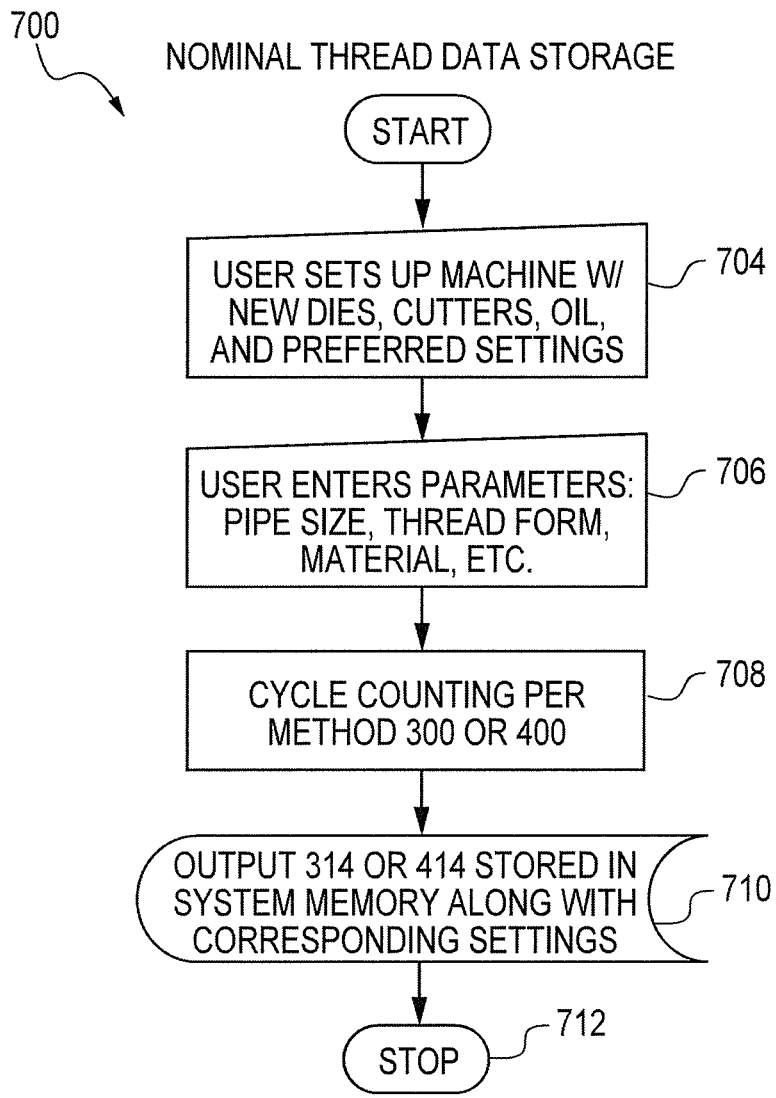
FIG. 14 is a flowchart illustrating an operational aspect relating to nominal thread data storage of the preferred embodiment thread forming device.

FIG. 14 is a flowchart illustrating a preferred operation 700 for storage of nominal thread data. Generally, after receiving a start or other signal indicating operation of the device 110, a series of operator prompts or information is requested and/or input by the operator such as parameters pertaining to the device 110, new dies, cutters, oil, and preferred settings. These are collectively depicted as operation(s) 704. Next, the operator may be prompted and/or enters information as to parameters of pipe size, thread form, material, etc. These are collectively referred to as operation 706. Next, cycle counting methods such as previously described in conjunction with method 300 of FIG. 9 or method 400 of FIG. 10 are performed, as generally referenced by 708. Next, in operation 710, one or more outputs, i.e. 314 or 414 (see FIG. 9 or 10) are stored in system memory in conjunction with the corresponding settings. A stop to the operation is shown as 712. The result of method 700 is to produce the benchmarks previously noted.

Figure 15:
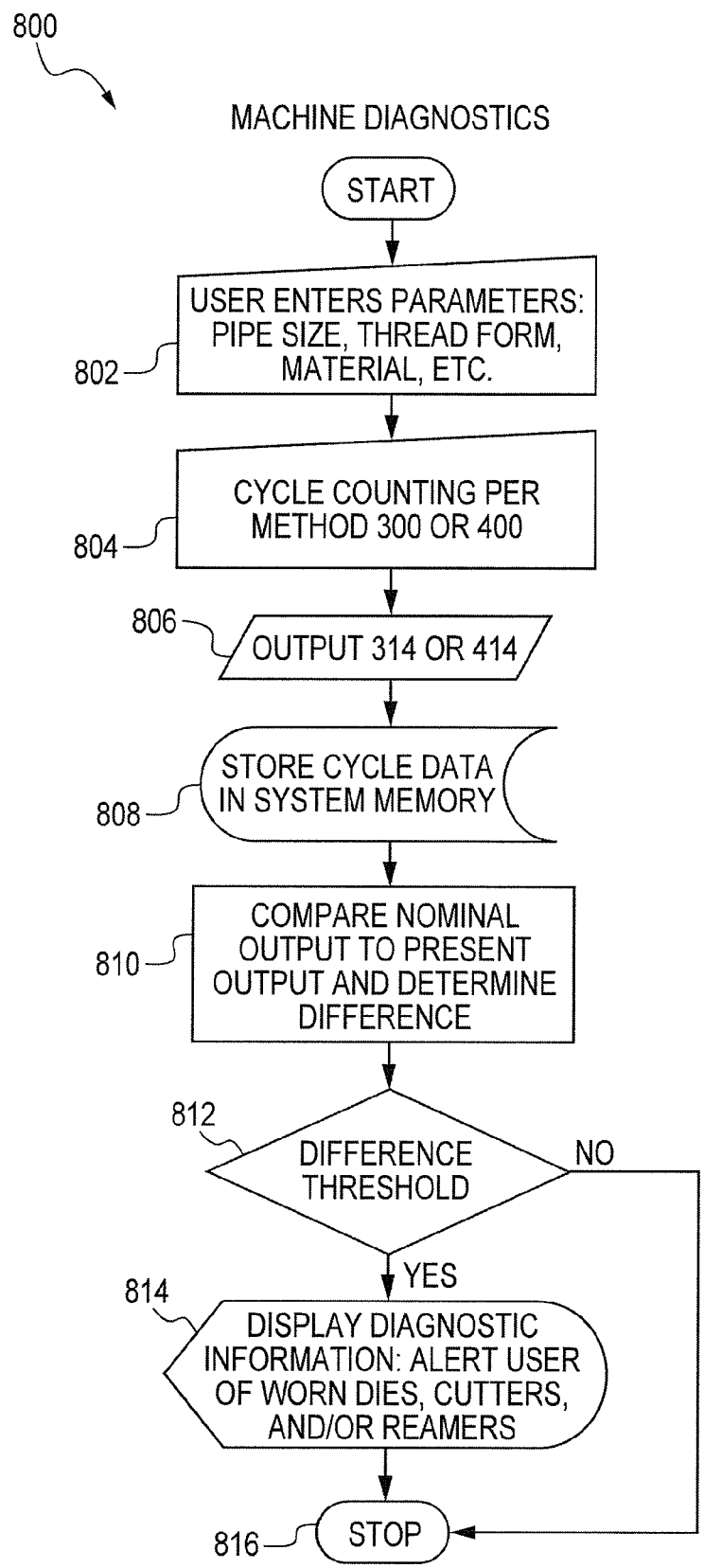
FIG. 15 is a flowchart illustrating another operational aspect relating to machine diagnostics of the preferred embodiment thread forming device.

FIG. 15 is a flowchart illustrating a preferred operation 800 for providing device diagnostics. Upon receiving a start signal, a user enters parameters such as pipe size, thread form, material, etc. These are collectively referred to as operation 802. Next, cycle counting selection 804 and methods such as previously described in conjunction with method 300 of FIG. 9 or method 400 of FIG. 10 are performed, as generally referenced by 806. In operations 808, 810, 314 or 414 (depending upon which method 300 or 400 is used) nominal outputs from on-board memory, are compared to the output of 806 to determine a difference value. This is generally shown as 810. As indicated at 812, if the difference is less than a threshold value, then the operation is stopped, as denoted by 816. And, in the event that the difference is greater than the threshold, diagnostic information is displayed or otherwise communicated to the user or other devices, as generally shown at 814. Examples of such diagnostic information include, but are not limited to, alerting a user as to worn dies, cutters and/or reamers. Diagnostics may also be accomplished by simply having user alerts when certain cycle milestones are reached. For example, when method 300 or 400 counts to 2,000 cycles, user alerts may be issued.

Figure 16:
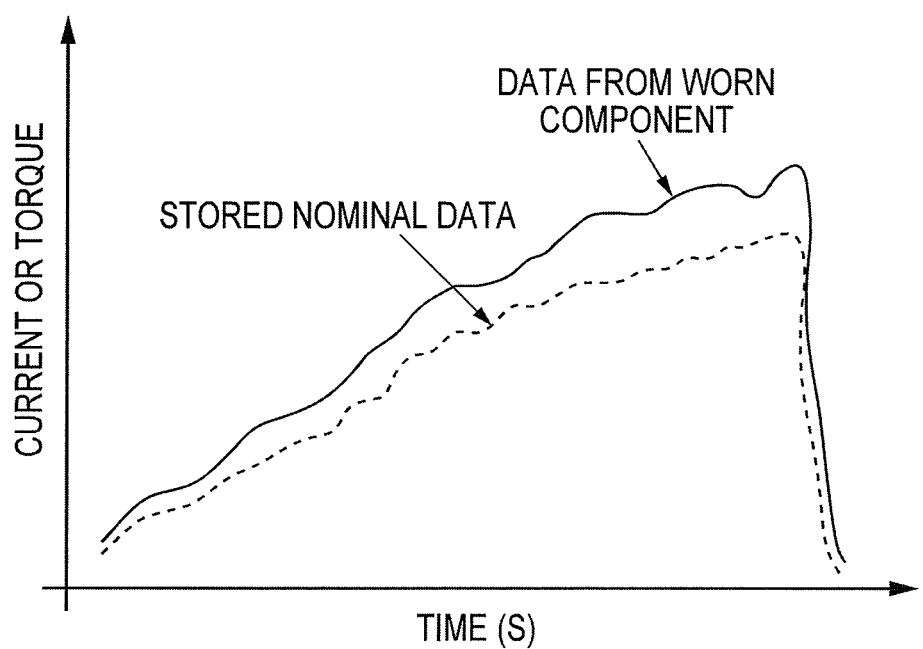
FIG. 16 is a graph illustrating current or torque as a function of time and representative profiles for (i) a nominal state, and (ii) a worn component state.

FIG. 16 graphically illustrates current or torque levels over time. Nominal current or torque profiles are stored in device memory. During operation, current or torque can be compared to such nominal profile(s). FIG. 16 illustrates an example of current or torque when the device utilizes a worn component. As will be appreciated, worn components typically cause increases in current consumption or required torque.

Figure 17:
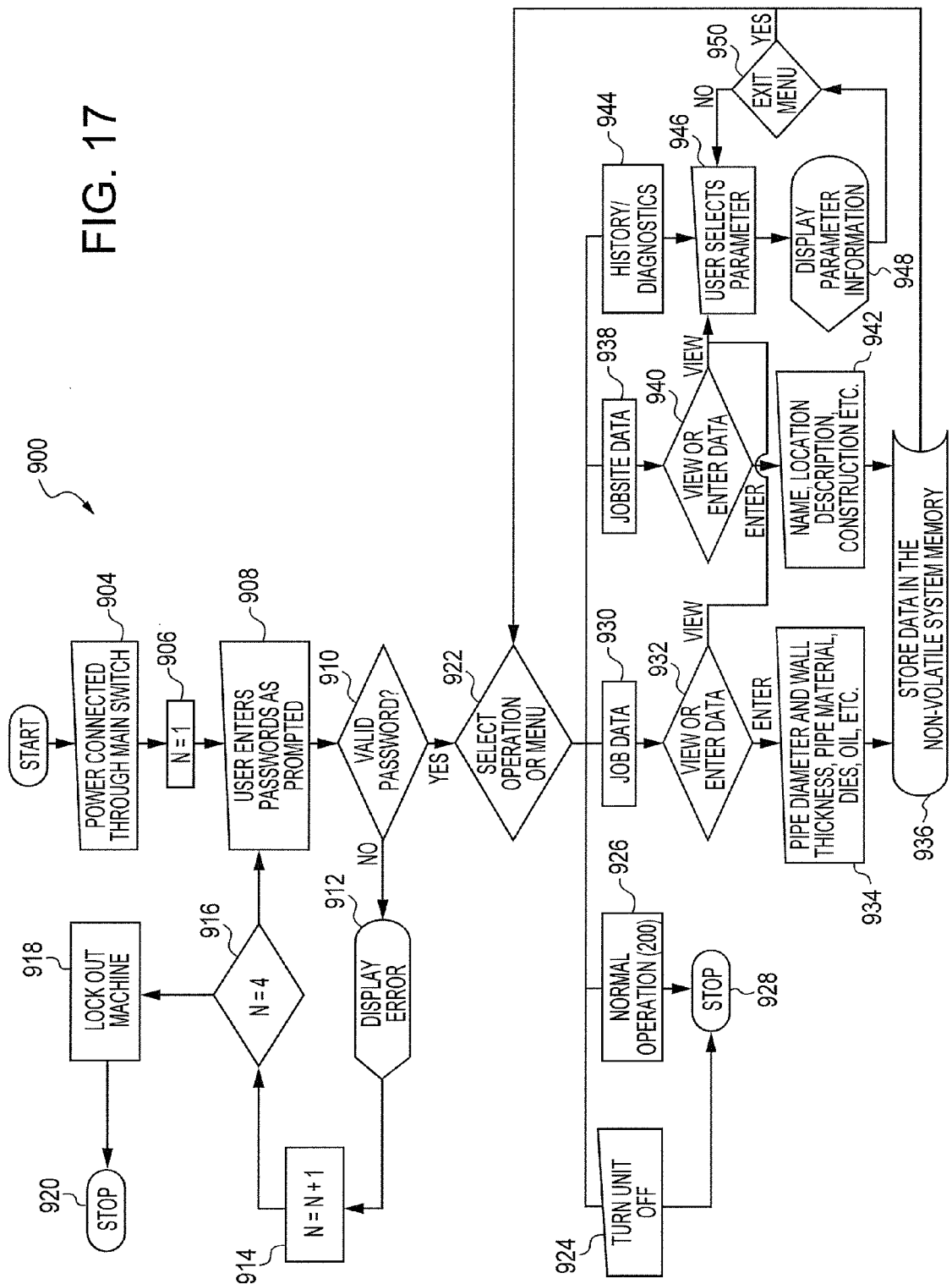
FIG. 17 is a flowchart illustrating menu operation pertaining to the preferred embodiment thread forming device.

FIG. 17 is a flowchart illustrating a preferred operation and device enabling control scheme 900. Upon receiving a start or other initiation signal and confirming a power connection through a main switch, collectively referred to as 904, a user is prompted for a password. A counter is also initialized at 906. At operation 908, the user enters his or her password. A check of the entered password is then made at 910. If the entered password does not match the correct password, an error is displayed at 912, and a cycle counter is incrementally increased and compared to a number representing the maximum number of attempts allowed before the device is locked or otherwise disabled. Although a maximum number of 3 tries is shown in method 900 via items 914 and 916, it will be appreciated that nearly any number of tries may be selected. In the event that a maximum number of unsuccessful password attempts occurs, the device is locked out at 918 and one or more stop signals 920 are issued.

In the event that a correct or authorized password is entered by the user, a selection menu is provided to the user at 922. One possible selection from such menu is to turn the device off, shown as 924. In that case, a stop or other shut down sequence is initiated as generally depicted by 928. In the event a normal or typical operation is selected by the user, wherein a method 200 depicted in FIG. 8 is performed for example, after completion of such operation, a stop 928 is issued by 926. In the event that the user selects job data at 930, the user can view or enter various data such as pipe diameter, wall thickness, pipe material, dies, oil, etc. These are generally referenced by 932 and 934. The particular job data is preferably stored in non-volatile system memory 4 (see FIG. 7), in operation 936. In the event that the user selects jobsite data at 938, the user can view or enter at operation 940 various data such as name, location, construction information, etc., collectively shown at 942 pertaining to the jobsite. This information is preferably stored in non-volatile system memory 4 (see FIG. 7), in operation 936. In the event that history or diagnostics are selected, such as via 944, the user selects various parameters at 946 and those parameters are then displayed at 948. Viewing is permitted and selective viewing between any of job data, jobsite data, and history/diagnostic information. Upon selection of a parameter, the user may continue to select other or additional parameters via 946 or exit the method 900 as shown in decision 950. Then, the method 900 is returned to the selection menu of 922 and the previously viewed or entered data is stored in system memory as per 936.

It will be appreciated that in no way is the present invention limited to any of the previously described methods, operations, sequences, or control configurations. Instead, the invention includes a wide array of variant and alternative methods, operations and the like. For example, although the present invention has been described in terms of powered devices for performing cutting, reaming, and threading operations, it will be understood that the invention is also directed to powered devices for performing roll grooving, cut grooving, beveling, pipe and conduit bending, and other operations. Generally, the present invention is contemplated to be useful in a wide array of operations typically performed upon workpieces such as cutting, reaming, and threading workpiece ends. In addition, the invention is expected to be useful in other workpiece operations such as roll grooving, cut grooving, and beveling. For example, the present invention can be implemented in a variety of devices to perform various cutting operations such as cutting with a feed screw cutter as described herein in conjunction with the preferred embodiment devices. The invention can also be used in embodiments that perform cutting with a single point saran cutter or other cutter adapted for cutting plastic or plastic lined pipe. The invention can also be used in embodiments that perform cutting with a circular pipe saw. In these cutting applications a powered rotary drive rotates the pipe or workpiece only. The powered rotary drive is not the source of cutting power. As noted, the present invention can be implemented in devices that perform a wide array of threading operations. For example, the invention can be implemented in a threading device with a universal die head, as in the preferred embodiment device described herein. The invention can also be used in threading applications using a ratcheting die head using fixed chasers such as exemplified by models 11R and 12R available from Ridge Tool under the designation RIDGID® manual ratchet threaders. The invention can also be used with threaders having receding die heads as exemplified by models 65R, 141, and 161 available from Ridge Tool under the designation RIDGID® manual receding threaders, including related accessories such as a drive shaft to connect a threading machine to a geared threader for threading workpieces with diameters exceeding the capacity of the machine. These accessories are exemplified by such components available from Ridge Tool under the designation RIDGID® geared threader accessories. As noted, the invention can also be used in grooving applications such as grooving with a dedicated threading machine roll groover as exemplified by models 916, 918, and 920 available from Ridge Tool under the designation RIDGID® roll groovers. In addition, the invention can also be used in grooving using a combination groover which can be used for installed or immobile pipe, such as exemplified by model 975 available from Ridge Tool under the designation RIDGID® combo roll groover. And, the invention can be used in grooving operations such as exemplified by a threading machine using a cut groover such as a model 725 available from Ridge Tool under the designation RIDGID® cut groove die head. Furthermore, as noted, the invention can also be used in beveling operations such as by using beveling dies as similarly described for the previously noted 725 die head. The invention can also be used in beveling operations in conjunction with a grinder or other tool with an abrasive wheel or belt. For many of these contemplated applications, the threading machine is used only as a means of rotating the pipe.

The present invention provides various systems, devices, and related methods for performing powered threading operations. Several particularly preferred systems and devices include features related to one or more of the following: improved energy efficiency, improved productivity, improved durability, reduced noise during operation, improvements in controlled braking, reduced in rush current spikes of the systems and/or devices, improvements in overload protection, the use of various low power and low voltage controls, increased range of input voltage, reductions in weight, improvements in assessing chaser wear, improvements relating to assessing oil characteristics, improvements in controlling thread length and/or size, improvements relating to assessing machine wear, and improvements in interfacing with other systems and/or devices.

In certain embodiments, it may be preferred to provide systems and/or devices having particular combinations of these features. Thus, three additional preferred embodiment threading systems and/or devices are described, each with particular features and combinations of features. Although these three preferred embodiments are described, it will be appreciated that in no way is the invention limited to any of these embodiments. Instead, the invention includes a wide assortment of other embodiments having one or more features and/or different combinations of features.

Preferred Version

A preferred embodiment threader device includes one or more of the following features.

A. Energy Efficiency

As far as is known, previous threading devices were relatively inefficient in terms of power consumption. The present invention threader device provides significantly increased levels of operating efficiency and productivity gains as compared to previous devices. Moreover, the preferred embodiment system and/or device may be operated at relatively high efficiency levels due at least in part to operational gains from the use of certain motors, and user selected controls. BLDC motors offer several advantages over conventional brushed DC motors, including higher efficiency. In addition, BLDC motors are often more efficient in converting electricity into mechanical power than brushed DC motors. This improvement is largely due to the absence of electrical and frictional losses due to brushes. The enhanced efficiency is greatest in the no-load and low-load region of the motor's performance curve. Under high mechanical loads, BLDC motors and high-quality brushed motors are comparable in efficiency. Increased efficiency of BLDC motors is also due at least in part to increases in pole count. Generally, increasing the number of poles causes a reduced step angle, thereby resulting in a reduced distance between magnets. Thus, in comparing a BLDC motor to a similarly sized brushed motor, the BLDC motor operates with greater efficiency.

A particularly preferred type of stator configuration used in a BLDC motor is one utilizing a segmented lamination technology. A motor using this technology features significantly reduced end turns in comparison to a traditional brushless motor, and results in increased thermal efficiency. Details as to segmented lamination stator technology are provided in an article by R. Welch, "Think Thermal to Increase Motor Efficiency," Motion System Design, p. 32-33, August 2009. Stators exhibiting this configuration are referred to herein as a "segmented tooth stator."

In certain embodiments of the present invention, the use of a BLDC motor enables reduction in the total number of gear stages in the device. Each gear mesh imparts friction in the drive or power train, thereby detrimentally impacting efficiency of the device. By reducing the total number of gear stages in the device, efficiency gains are attained.

B. Productivity

Previously known threading devices were limited in the extent of control features provided for such devices. As a result, relatively low productivity levels were associated with previously known devices.

As explained herein, by providing specific control of threading, cutting, and reaming operations using information obtained by associated sensors, the preferred embodiment threader device provides improvements in productivity.

As explained herein, a preferred embodiment threader device includes various features that enable improved operator control over the device and its components. For example, multiple modes of operation are provided whereby a threading operation can be performed in which one or more parameters relating to electrical current consumption, cycle counting, and sensor feedback are utilized to control the operation of the device.

For example, referring to FIG. 8, a mode 238 for operation of the device 110 can be selected with a goal of optimizing overall efficiency. Alternatively, a goal of optimizing cycle time via mode 240 can be selected. Yet another mode may pertain to utilizing a constant speed, depicted as 242. One or more of these modes are then used in conjunction with signals associated with electrical and temperature signals, to arrive at a target RPM set point as noted at operations 244 and 246

Furthermore, as described herein, the preferred embodiment threader device comprises a BLDC motor. BLDC motors offer several advantages over conventional brushed DC motors, including for example greater levels of power. The maximum power that can be applied to a BLDC motor is exceptionally high, limited almost exclusively by heat.

Based on several factors, the productivity gains associated with BLDC motors in the preferred version under discussion are not primarily related to sensors and controls as for other preferred embodiments described herein.

For certain motor configurations, the most efficient mode of operation is to operate the BLDC motor at the maximum power.

The preferred embodiment system and/or device comprises a control system governing operation of the BLDC motor. In one particularly preferred aspect, the control system includes a power factor correction (PFC) function or unit. The power factor correction (PFC) function of the control system actively boosts the voltage to the PWM driver PCB. As torque increases, the voltage to the motor is maintained at a higher level compared to a rectifier configuration. The greater voltage results in a greater motor RPM. Thus, the cycle time for an equivalent operation is reduced.

C. Durability

As will be appreciated, it would be desirable to provide a thread forming device that exhibits a high level of durability. The preferred embodiment system and/or threader device also exhibits greater durability as compared to previous devices.

The improved durability is believed to result from one or more of the following features: With no windings on the rotor, BLDC motors are subjected to less centripetal force. Improved durability also results from avoiding the use of brushes in the motor.

Additionally, previously known threading devices exhibited relatively low durability as a result of the use of components susceptible to wear, for example brushes in the motor.

BLDC motors offer several advantages over conventional brushed DC motors, including higher efficiency and reliability, and longer lifetime as a result of no brush and commutator wear.

Improved durability may also result from a reduced operating speed (RPM) and/or gear stages as a result of utilizing a BLDC motor.

Moreover, BLDC motors also typically operate slower at the same horsepower as equivalent brushed motors. Thus, BLDC motors exhibit higher power to RPM ratios as compared to brushed motors. Depending upon the configuration and implementation of the BLDC motor, it may be possible to eliminate one or more drive gears otherwise necessary to achieve certain rates of powered rotation of a drive output.

Improved durability also results from enclosing the motor. Specifically, yet another advantage associated with the preferred embodiment system and/or device relates to durability improvements as a result of eliminating entry of external agents into the motor environment. For example, because the windings in a BLDC motor are supported by the housing, they can be cooled by conduction, thereby not requiring airflow inside the motor for cooling. This in turn means that internal components of the motor can be entirely enclosed and protected from dirt or other foreign matter. This is particularly a concern for threading machines because metal chips are produced from the operation of the device.

However, it will be understood that an internal fan or cooling assembly can be included in association with the BLDC motor when utilized in the preferred embodiment thread forming devices. Optionally and preferably, an external motor fan such as fan 85 in FIG. 5 for example can be used provided to direct air past the various motor components and provide additional cooling thereof.

Improved durability also results from no carbon dust generated by brushes, as the motor is a brushless motor. Carbon particles are dispersed through the machine and can contaminate other regions and surfaces of the threader device.

Improved durability also results from significant reduction in ozone generation. BLDC motors offer several advantages over conventional brushed DC motors, including elimination of ionizing sparks from the commutator.

Improved durability also results from reductions in electrical noise. BLDC motors offer several advantages over conventional brushed DC motors, including reduction of electromagnetic interference (EMI). Reductions in electrical noise may also result from directing incoming electrical current to a rectifier and power factor correction device.

D. Noise Reduction

BLDC motors offer several advantages over conventional brushed DC motors, including reduced acoustic noise. As will be appreciated, exposure for prolonged time periods to high levels of acoustic noise can be detrimental. BLDC motors typically exhibit lower sound levels during operation over comparable brushed motors.

E. Controlled Brake

Additionally, the preferred embodiment system and/or device also includes provisions for controlled braking. For example, referring to FIG. 8, dynamic braking is applied, shown at 232, to stop further rotation or other operations, as depicted at 234. In the event that one or more fault or error signals are detected, an error message or indication is made at 264, and dynamic braking 266 is applied to the motor 28 to effect a stop 268.

F. Soft Start

The preferred embodiment threading system and/or device also includes a soft start provision. The soft start provision provides a gradually increasing electrical power source to the BLDC motor using the drive pulse width modulation (PWM) capability. Preferably, the soft start is used to activate the motor. In addition, the PWM capability may also be used to stop the preferred system and/or device. Most preferably, the PWM capability initiates dynamic braking.

G. Overload Protection

The preferred embodiment system and/or device also comprises an overload protection feature. The overload protection can provide electrical current overload protection and thermal overload protection. Representative examples of these are as follows.

1. Current Overload Protection

A preferred current overload provision is shown in FIG. 8. Specifically, signal 254 conveys information as to whether the current at the motor 28 (see FIG. 2) is at a critical or other unsatisfactory state. Current overload may be desirable as such provisions can be utilized to diagnose high torque conditions, motor failures based on baseline data or nominal data of the motor, and other states.

2. Thermal Overload Protection

A preferred thermal overload provision is depicted in FIG. 8 as 256 by use of a motor temperature sensor 27 (see FIG. 7). The motor temperature sensor 27 is preferably provided for temperature measurements to an on-board control or monitoring system. An internal fan or cooling assembly can be included in association with the motor 28. Optionally and preferably, an external motor fan such as fan 85 in FIG. 5 for example, can be used to direct air past the various motor components and provide additional cooling thereof. Generally, the optional supplemental fan 85 is operated or triggered by machine startup or high temperature conditions. The signal 256 in FIG. 8 conveys information as to whether temperature at one or more locations in the device 110 is excessively high. As shown, a circuit board temperature sensor 15 in FIG. 7 may be provided in association with the printed circuit board driver 16.

H. Universal Power Supply

The preferred embodiment system and/or device also includes provisions to accommodate electrical power from any common source worldwide. Typically, power sources exhibit a voltage range of from about 100 volts to about 240V, at a frequency of from about 25 Hz to about 60 Hz. Incoming electrical power is used by a power supply (rectifier) for power factor correction. In certain versions, it may be desired to record the incoming voltage or other power source characteristics in non-volatile memory preferably located on-board the preferred embodiment threader device.

I. Reduced Weight

Another feature of the preferred embodiment threading system and/or device is the relatively low weight of the apparatus. This is partially due to the fact that BLDC motors exhibit reduced size and weight as compared to equivalent brushed motors. This translates to higher power to weight ratios over equivalent brushed motors.

Additional Preferred Version

Another preferred embodiment threader device includes one or more of the following features. Although certain features may be similar to features of the previously described preferred version, typically the features of this preferred version are provided for or performed using different components and/or techniques.

A. Energy Efficiency

As noted, BLDC motors are available from various commercial suppliers. Using a 10 pole brushless motor prototype with segmented lamination or "segmented tooth stator," an evaluation regarding energy efficiency of BLDC motors was undertaken. Data was collected using the motor installed in a 300 Compact pipe and bolt threading machine available from Ridge Tool under the designation RIDGID®, with a three phase SP2201 servo motor drive available from Control Techniques. This included dynamometer data to determine energy efficiency versus torque, and threading data to measure energy savings based on a threading cycle.

Figure 18:
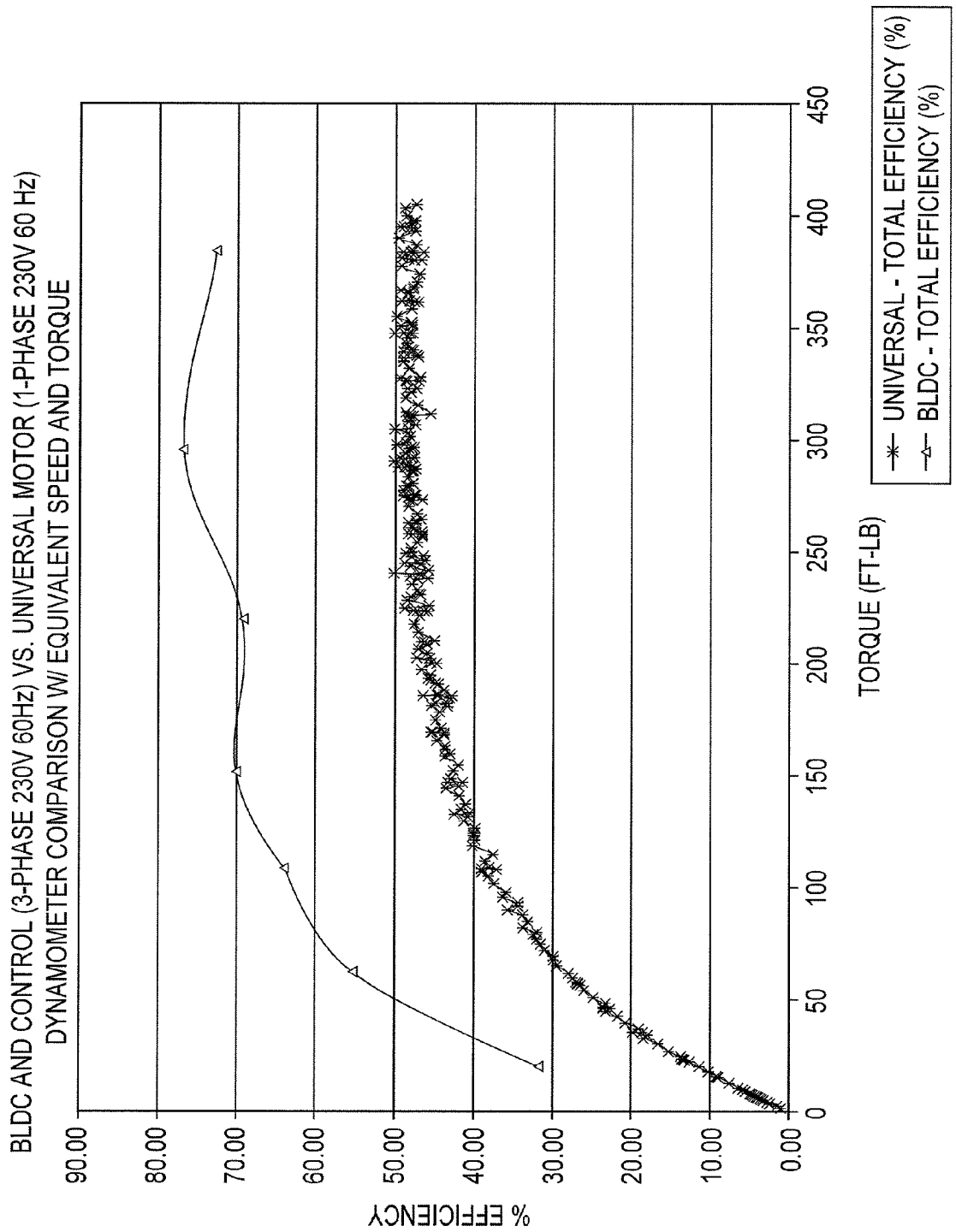
FIG. 18 is a graph illustrating total efficiency of a brushless motor compared to a universal motor over a range of torque loads.

In one test, the dynamometer data demonstrated that an increase of approximately 25% in peak efficiency results from using the prototype BLDC motor. Although a three phase control was used for preliminary testing, a single phase control is preferred for the commercial version of the unit. It is estimated that a 5% reduction in peak efficiency would result from the change. Thus, the data collected indicates that a gain of approximately 20% in peak efficiency would result. See FIG. 18 in this regard. The BLDC motor exhibited significantly greater efficiencies as compared to the corresponding universal motor at all torque values.

Figure 19:
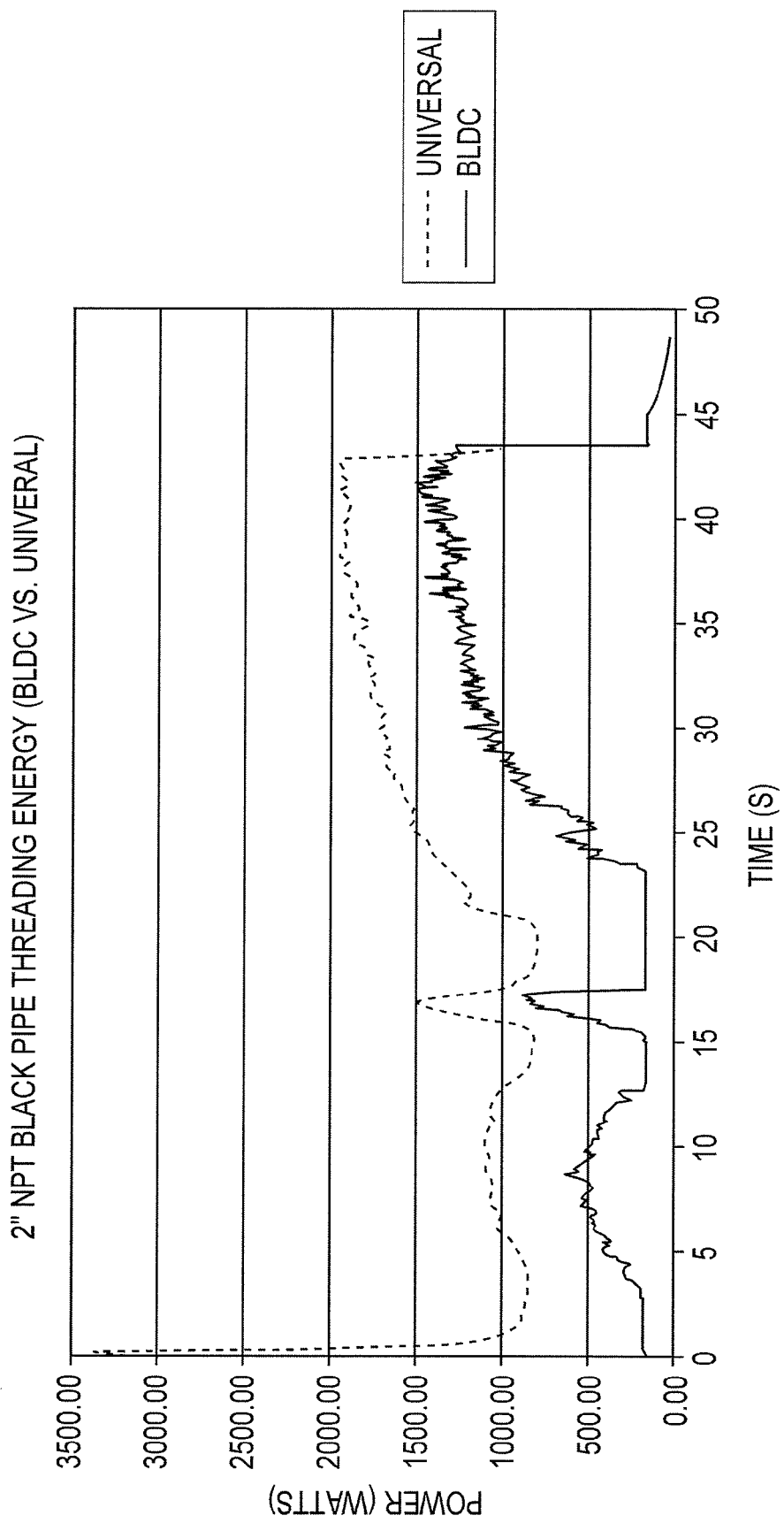
FIG. 19 is a graph illustrating power consumed by a preferred embodiment thread forming device using a brushless motor compared to a thread forming device using a universal motor while performing a threading operation.

The threading data demonstrated that the energy savings of the threading operation was greater than the difference in peak efficiency. This is best illustrated by considering the area under the curve for cutting, reaming, and threading operations. In one test, it was found that the reduction in energy used per cycle was 43.2%. Again, this value was approximate given that a three phase control was used. See FIG. 19. Significantly less power was required by the BLDC motor as compared to the universal motor.

Because a threading machine is a variable load application, it is not possible to design the motor and transmission for a single constant load or torque. As a result, the machine can not operate at the peak efficiency all of the time. For operation below the peak efficiency, BLDC technology is particularly suited to provide energy savings.

B. Productivity

Using data from initial evaluations, a single phase prototype control was developed. The performance of the motor was tested outside of a machine using a rectifier and power factor correction (PFC) DC bus (the distinction between each is described below). Based on the data, an increase of approximately 20% gain in peak machine efficiency is expected. Increased efficiency can be understood by reference to FIG. 20.

Figure 20:
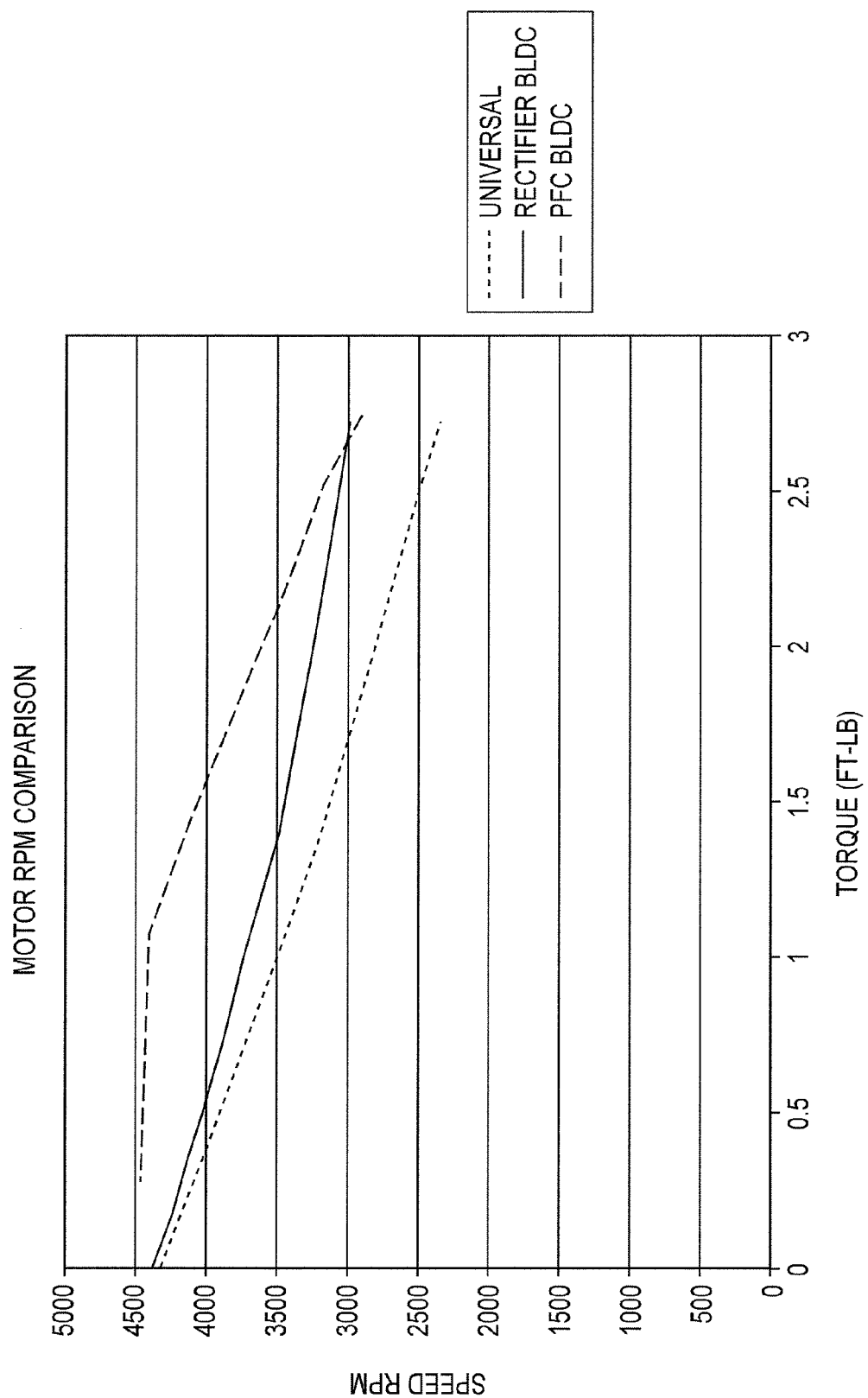
FIG. 20 is a graph illustrating torque outputs at various rotational speeds of a brushless motor with a rectifier, a brushless motor with a controller having a power factor correction function unit, and a universal motor.

Specifically, one test showed that the PFC driven BLDC motor outperformed the universal motor and rectifier driven BLDC motor with regards to productivity. As previously mentioned, the power factor correction (PFC) function of the control system actively boosts the voltage to the motor to allow the speed to be maintained as torque is increased. Data from the single phase prototype shown in FIG. 20 illustrates the difference.

All of the previously described advantages associated with improved productivity are exhibited by the preferred embodiment under discussion.

C. Durability

As previously noted, improved durability will result from reduced RPM and lower gear stages.

For the preferred embodiment threading machine under discussion, the free rotational speed of the 10 pole motor was reduced by a factor of 3.75 as compared to a universal motor it was replacing. This is approximately equal to the gear ratio of the first intermediate stage of a conventional 300 Compact threader device. Therefore, when utilizing certain BLDC motors in a preferred embodiment threader device, it is possible and in certain applications likely, that one or more gears or stages otherwise required, could be eliminated. Elimination of such component(s) promotes durability of the resulting device and may provide additional advantages such as reduced weight, lower cost, and improved operating efficiency.

Figure 21:
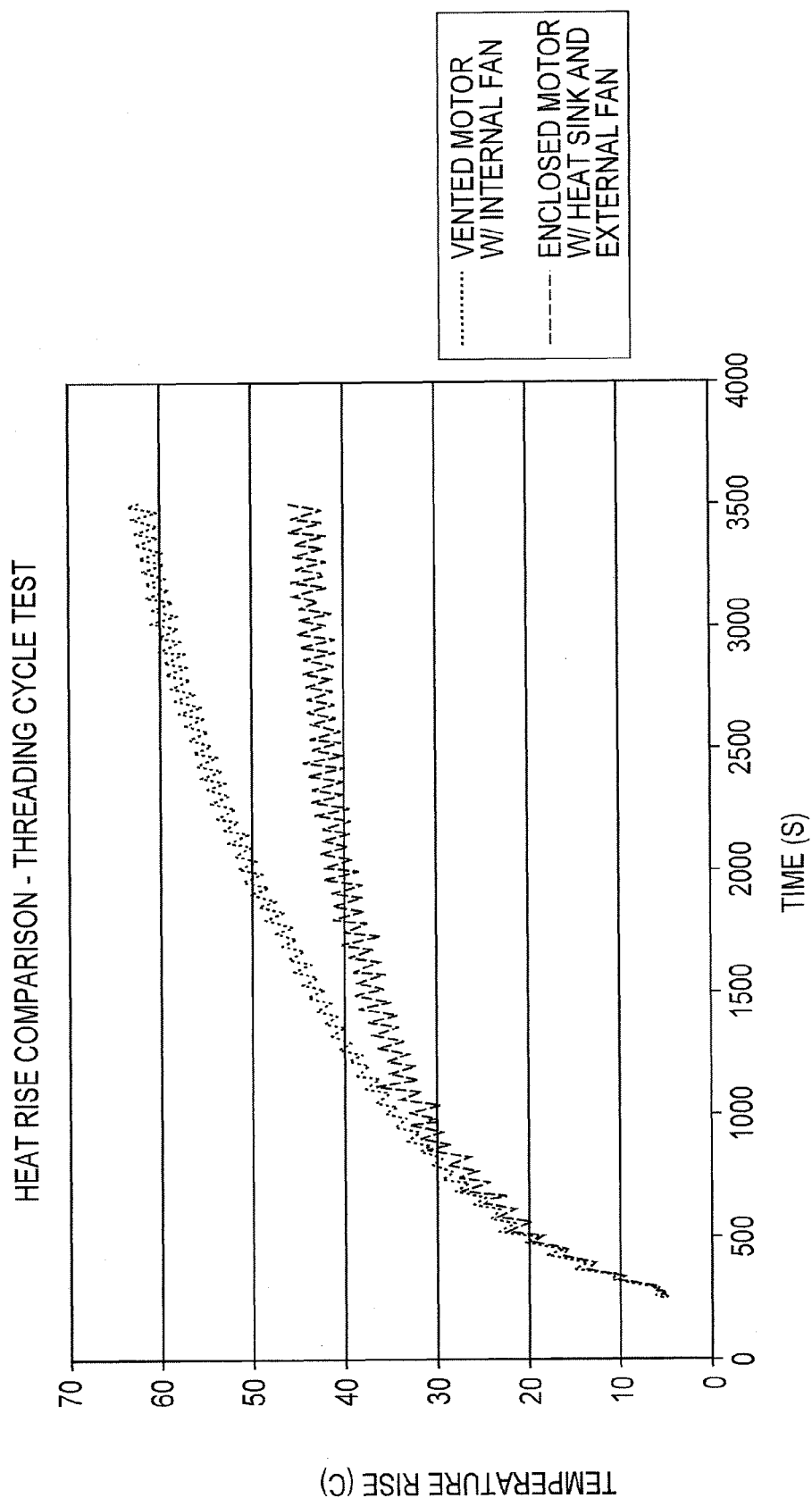
FIG. 21 is a graph of temperature increases for a vented motor with an internal fan, and an enclosed motor with an external fan.

Improved durability may also result from enclosing the motor from debris. This was confirmed with a heat rise test with an external heat sink and fan configuration. This configuration produced excellent results and is preferred for use in the preferred embodiment. Referring to FIG. 21, an enclosed motor with a heat sink and an external fan exhibited less temperature increase during operation as compared to a vented motor with an internal fan.

Improved durability may also result from reduced carbon dust. Carbon dust from the brushes of a universal motor is a contributor to the break down of an insulation system within a motor (dielectric strength). As a result, the accumulation of carbon dust can detrimentally reduce the life of an electrical motor.

D. Noise Reduction

Using prototype machines, the noise levels of a thread forming device with a universal and BLDC motor were compared. In one test, the noise levels were reduced from an average of 85 dBA to 70 dBA. This demonstrates a significant reduction in acoustic noise by the preferred embodiment threader using a BLDC motor.

E. Controlled Brake

During the testing of a preferred embodiment thread forming device using a 10 pole BLDC motor, it was observed that the time required to stop the device was greatly reduced simply by the cogging torque of the motor. The permanent rotor magnets' interaction with the inactive stator produced enough resistance to bring the device to a near immediate stop. Universal and induction motors do not have this characteristic because they do not use permanent magnets.

In the preferred embodiment thread forming system and/or device, it is believed that no significant further reduction in stopping time can be made by dynamic braking. However, it is contemplated that the components of the preferred embodiment device and their inertia and that of the machine undergoing shut down could be utilized to produce electrical power, i.e., utilize the motor as an electrical generator.

F. Soft Start

The soft start feature described herein allows the preferred embodiment threader device to accelerate to free speed without causing an inrush current spike. In addition to reducing the peak load of the motor windings, the soft start feature reduces the voltage drop that results from the current spike. The current spike of a universal or induction motor may cause a voltage fluctuation which disrupts the local power supply. Thus, this is yet another advantage in utilizing a BLDC motor.

A soft start feature may be added to a universal motor using pulse width modulation (PWM). However, as described herein, during normal use BLDC motors operate using PWM. Thus, applying a soft start feature to the preferred embodiment threader device is only a matter of software design and does not require additional hardware capability.

G. Overload Protection

Referring to FIGS. 7 and 8, various functions relating to overload protection are provided by the driver printed circuit board (PCB).

H. Low Voltage Controls

The preferred embodiment system and/or device also preferably includes one or more low voltage controls. For example, referring to FIG. 7, a switch 18 is used in association with a footswitch 10. The switch 18 is connected with the footswitch 10 to indicate that there is an electrical footswitch signal connection to the control and an additional connection to the power side. Thus, if the control were to not respond to the footswitch, the phase wires would be opened to stop motor rotation. All three phase lines would either be opened or closed.

In the embodiment under discussion, the BLDC motor is controlled with the PWM from the motor drive printed circuit board (PCB). In the system configuration of a BLDC threading machine, there is no need for the controls to carry the electrical loads of the motor itself. Instead, the controls carry, for example, 0-5 VDC to communicate with digital inputs and outputs on the control circuitry. This results in switches and controls with smaller and lighter construction.

FIG. 7 shows an electrical and signal connection for the footswitch. The electrical connection is redundant and can be eliminated in this additional preferred configuration.

I. Universal Power Supply

Any common frequency can be used for powering the preferred embodiment threading devices because the power factor correction (PFC) device converts the line input to a DC bus. The PFC can maintain the bus voltage (400V) down to 90VAC line. A bus voltage of approximately 400V is commonly used to maintain high efficiencies.

The preferred line voltage range for the preferred embodiment unit is from about 90 to about 240 VAC, 1 Phase, 50-60 Hz based on the operation of the PFC and the power sources available in the market. Because the BLDC driver requires only a DC bus, various sources of different phases, frequencies, and voltages can be used.

A wide range of applications for BLDC motors exist which use DC sources such as batteries instead of converted AC line sources. Generally, these configurations use motors with a lower voltage rating, for example 48V. In such configurations, the rectifier or PFC is not needed. Instead the source is connected directly to the driver PCB. A preferred embodiment threading machine could be configured to operate using a DC power source with a motor designed for the DC voltage. The benefits of the BLDC technology compared to brushed motors (efficiency, durability, and productivity) would still be exhibited. Induction motors can not be used with a DC source unless drive electronics are used to produce AC waveforms.

J. Reduced Weight

Based on the previously noted 10 pole motor, the size and weight of BLDC motors were compared to certain induction and universal motors for threading applications. The comparison of these measurements is set forth below as Table 2.

TABLE 2

Comparison of Motor Weights

| Technology | Motor Weight (lb) |
|---|---|
| Induction Motor | 37.5 |
| Universal Motor | 12.7 |
| BLDC Motor | 6.7 |

K. Limited Torque Design

In a BLDC motor, the phase current to the motor, typically expressed in Amps-rms, is directly proportional to the torque output (in-lb). As a result, the maximum torque of the motor can be set by limiting the current in the control software. In this system, current feedback is provided to the control through a current sensor. If the preferred embodiment thread forming device is provided with current overload protection, this hardware is already in place. To implement this feature in a device with a brushed motor, a control with current sensing capability would need to be added to the system. This would increase the cost and complexity of the resulting system.

Figure 24:
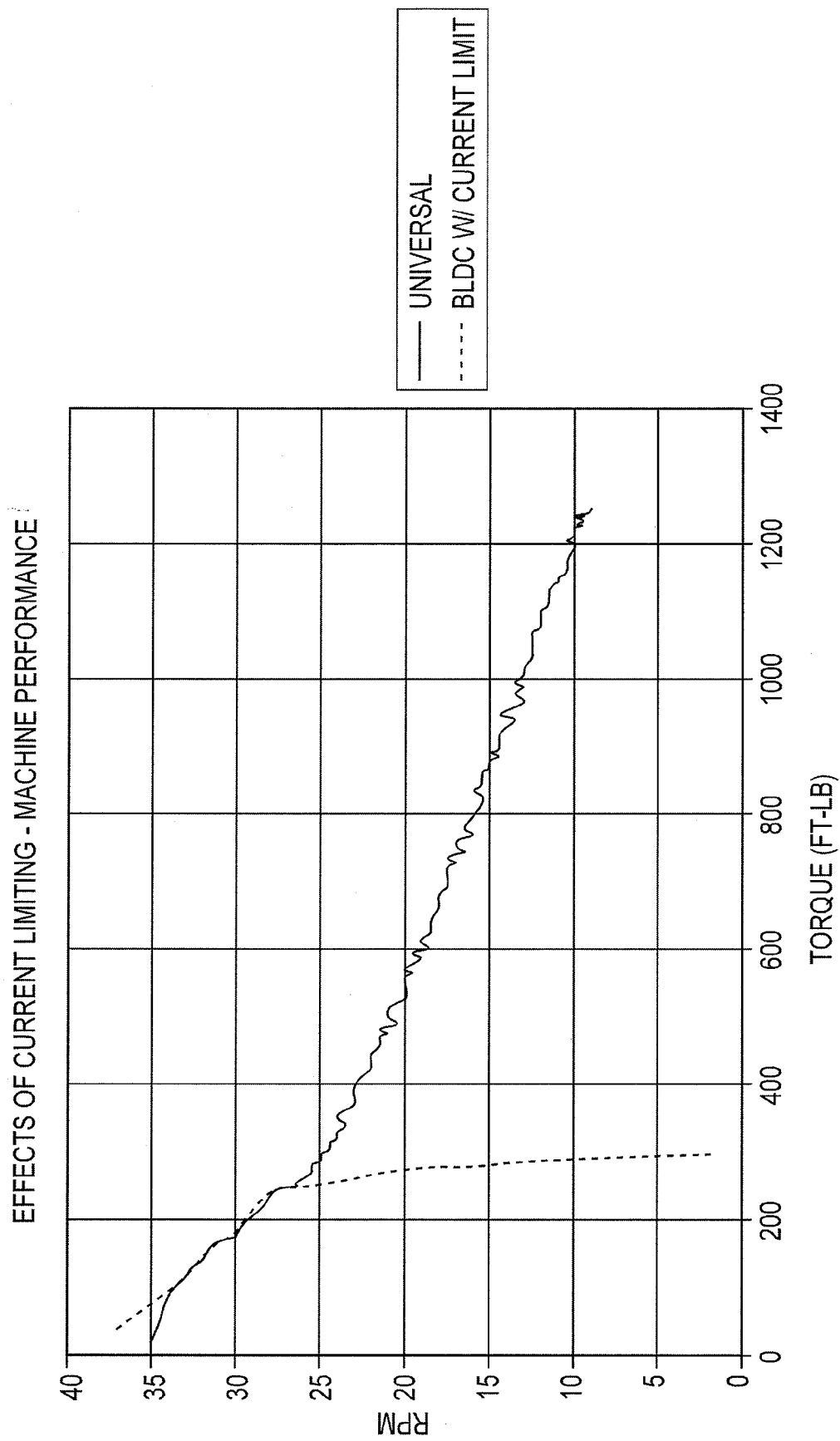
FIG. 24 is a graph illustrating effects of torque current limiting on RPM for a brushless motor and a universal motor.

A projection of the operation of a machine with a current limited motor is presented in FIG. 24. In comparison to a universal motor as is used in a conventional 300 Compact device, the stall torque is greatly reduced. However, the torque capability is well above the requirements of the operations typically associated with the machine such as for example threading, reaming, cutting, and grooving.

Figure 25:
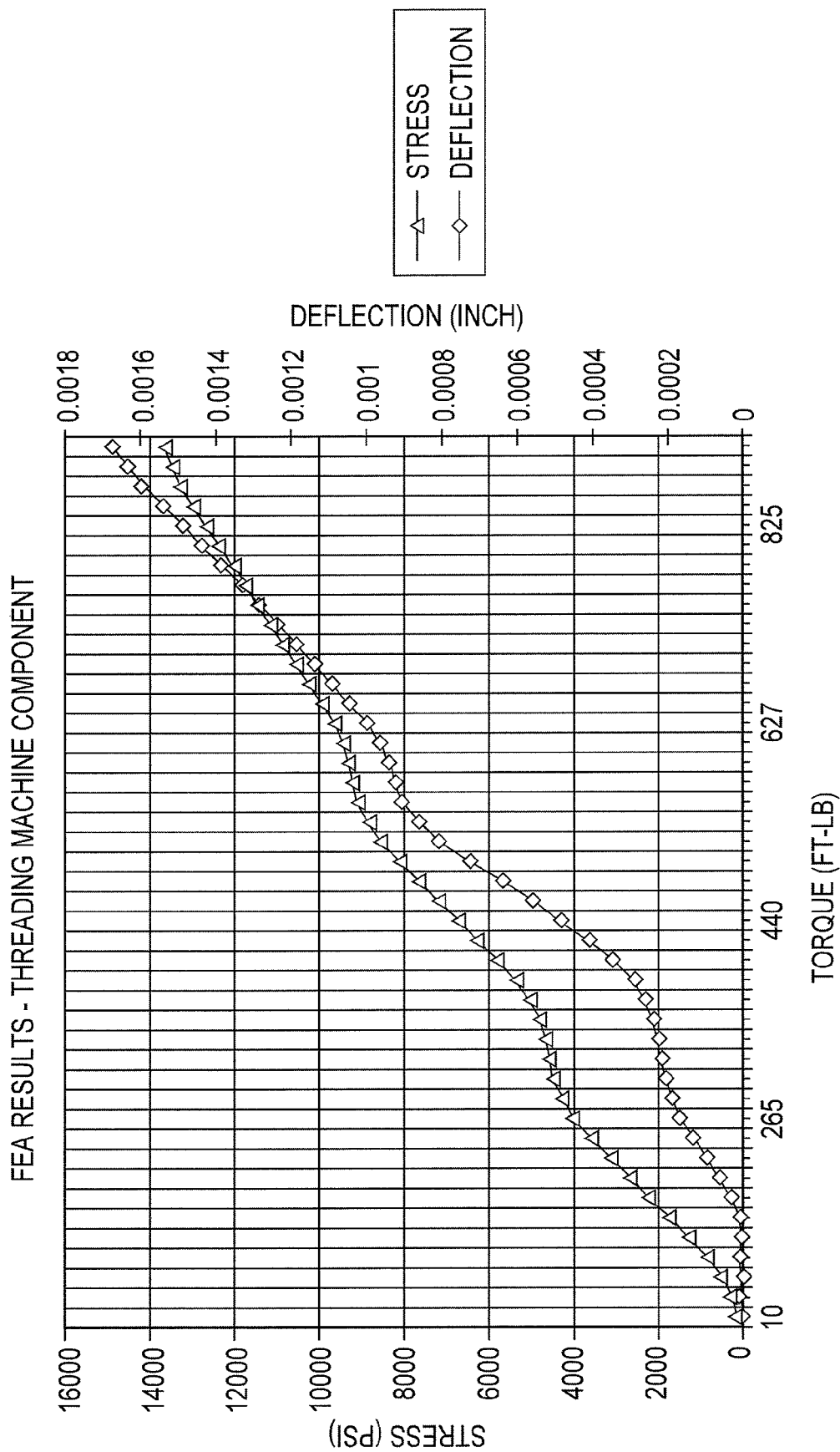
FIG. 25 is a graph illustrating typical stresses and deflections as increasing levels of torque are applied to a threading machine component.

The design of a threading machine must take into account the worst case for the loading of the components. Thus, the stall condition and not the loads of the threading operation must be considered. Finite Element Analysis (FEA) is an example of a technique used to design machine components to withstand the maximum loads placed upon them. FIG. 25 shows a representative relationship between the torque load on the system and the mechanical stress and deflection in a machine component. By limiting the torque, the size and weight of machine components may be reduced according to the lower levels of mechanical stress and deflection that result.

L. Electrical Noise

By removing the brush sparking from the system, the electromagnetic interference (EMI) produced by the motor may be reduced. However, the effects of the change depend on the operation of the rectifier or power factor correction (PFC) device.

It should be noted that a rectifier and PFC are two distinctly different ways to produce a DC source for the control and driver. A system with a PFC is preferred for use in the preferred embodiment threader device.

Figure 22:
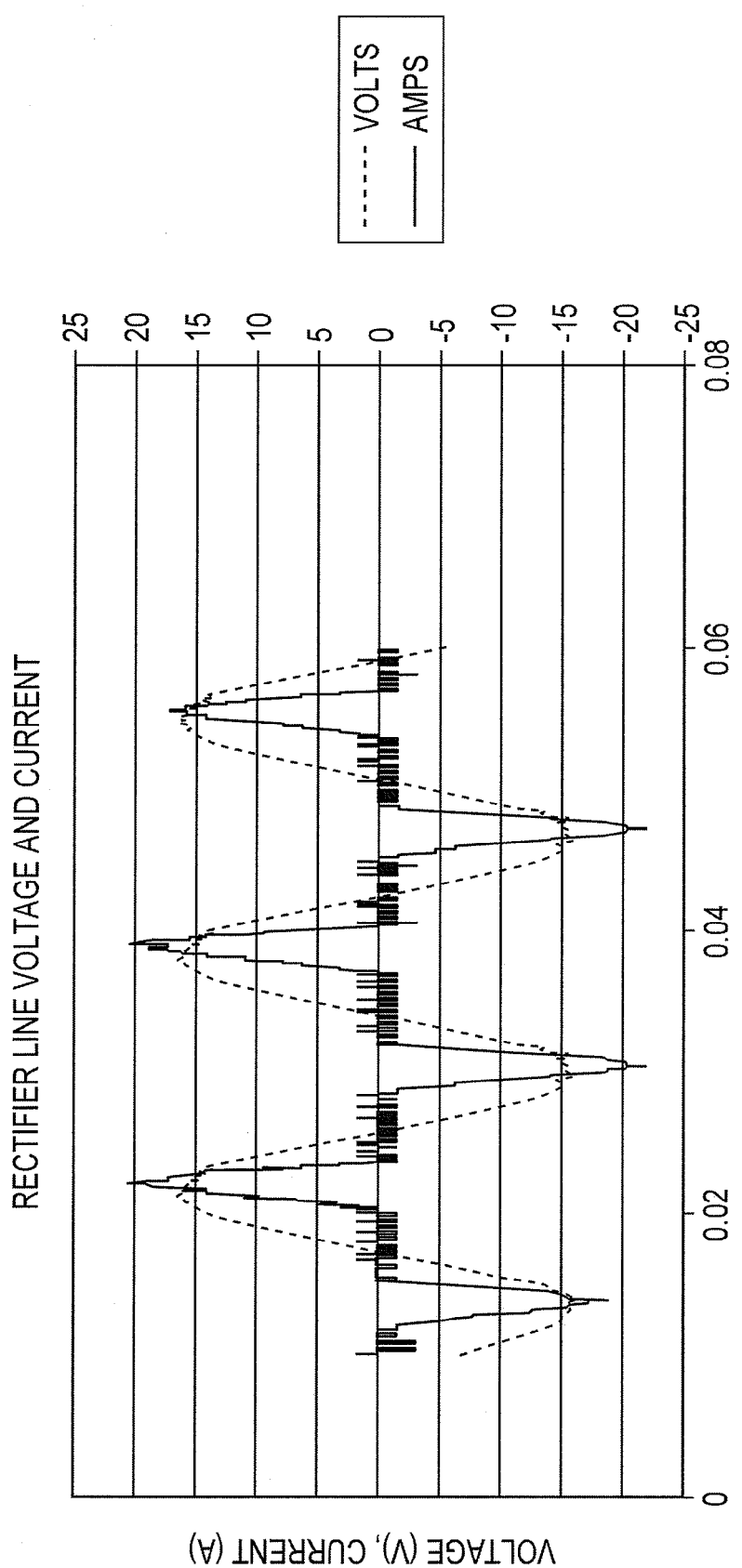
FIG. 22 is a graph of line voltage and current over time for a brushless motor using a rectifier.

A rectifier does not produce significant EMI. However, a rectifier produces poor harmonics on the line input. This is illustrated in FIG. 22. In addition, the motor is typically unable to maintain speed at low voltages and high torques due to voltage drops in the rectifier.

Figure 23:
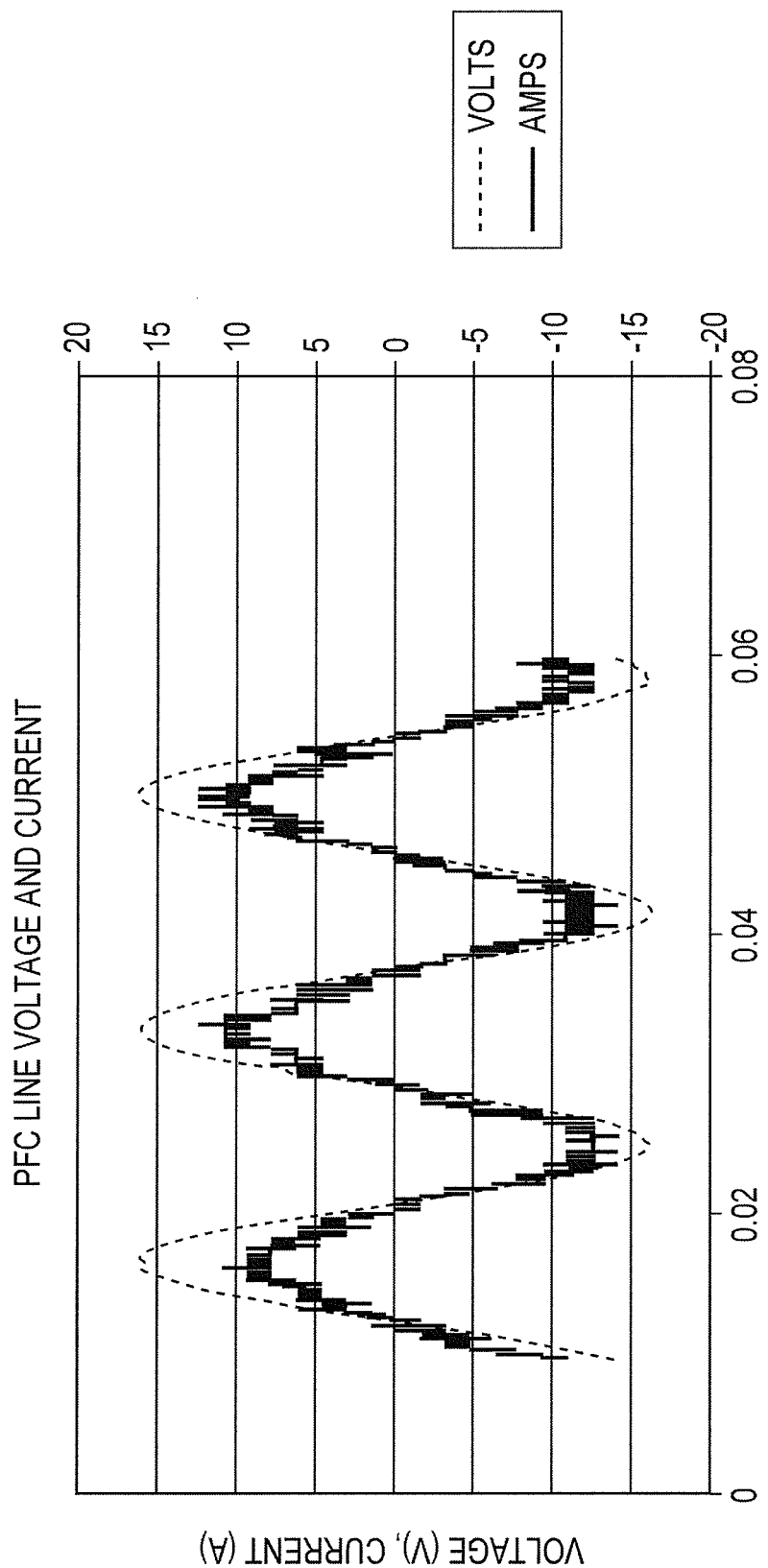
FIG. 23 is a graph of line voltage for a brushless motor using a controller with a power factor correction function.

A PFC provision will correct the harmonics of the system and boost the voltage as illustrated in FIG. 23, but such provisions also produce EMI. As with a brushed motor, filtering is required. Thus, there are no appreciable gains in EMI for a unit with PFC although a unit with a PFC is the preferred configuration.

Additional Preferred Version

The present invention also provides additional preferred embodiment threading systems and devices which include additional functional features such as provisions for detecting and assessing chaser wear, oil characteristics, occurrence of cavitation, thread length and size, machine wear, and various interfaces.

A. Chaser Wear

Monitoring and/or analyzing electrical current draw can be used to determine the operation in progress, e.g., thread, cut, or ream. In this feature, volatile memory is used to track current over a time period and recognize the "signature" of the operation. The result, i.e., type of operation, is recorded in non-volatile memory. The operation may also be determined based on additional information from the cutter, reamer, and die head sensors, but it is not required. These provisions can be used to record baseline thread current information once a user has all settings in place. These provisions can also be utilized to diagnose high torque conditions (chaser wear) or motor failures based on baseline data or nominal data of the motor.

Previously described FIG. 14 is a flowchart illustrating an example of storing nominal thread data.

Previously described FIG. 15 is a flowchart illustrating an example of providing device diagnostics.

Previously described FIG. 16 graphically illustrates monitoring current or torque levels over time. Nominal current or torque profiles are stored in device memory.

B. Oil Sensors

1. Low Oil Shut-Off (Oil Control)

One or more oil sensors such as oil sensor 22 depicted in FIG. 7, provide signals which are monitored to assess whether sufficient oil levels exist within the hydraulic and/or lubrication system. In the event that a low oil signal is detected such as via operation 210 in FIG. 8, a low oil level indicator is activated as shown by 212 in that figure.

Depending upon the condition or state of an oil level sensor, alerts can be issued to add or change oil. The device 110 also comprises a hydraulic pressure system and/or lubrication system to one or more components of the device. For example, an oil level sensor 22 is provided in the system and is positioned within the sump to detect the oil level therein.

2. Oil Temperature

For example, referring to FIG. 2, the device 110 also comprises a hydraulic pressure system and/or lubrication system to provide such to one or more components of the device. One or more temperature sensors are provided to provide information as to oil temperature.

3. Cavitation/Direction

For reverse rotation of the preferred embodiment threader, the device components are configured appropriately such as by moving one or more valves to their reverse position such as shown in 218 in FIG. 8. Similarly, for forward rotation, the one or more valves are moved to their forward position as shown in 220 in FIG. 8. Changes in valve positions direct pressurized hydraulic fluid to other components of the device and may selectively re-position those components. The main function of the pump is to circulate cutting fluid, not to provide hydraulic fluid for power. It will be noted that the oil is pumped through the die head.

The preferred embodiment device also comprises a hydraulic pressure system and/or lubrication system to one or more components of the device. Also provided in communication with one or more oil flow lines are solenoid valves such as valves 6 in FIG. 7 which selectively govern oil flow to components of the device. For example, the solenoid valves 6 govern flow of oil to a positive displacement pumping unit or gerotor 52 as depicted in FIG. 5.

The control circuitry governs operation of one or more solenoid valves, the die release, and other components.

4. Oil Life

There is no single sensor which can be used to detect the overall condition of the oil, in terms of its remaining useful life.

However, the inputs and hardware to determine the status of the oil are already in place in the preferred embodiment thread forming systems and devices. Based on oil temperature, cycle counts, current consumption, and/or the change in oil level over time, it is contemplated that an algorithm can be used to determine the state of the oil in the sump.

C. Thread Length and Size

Carriage position can be monitored by tracking movement of the carriage relative to the rail. Carriage position can then be utilized to determine the thread length and identify the type of thread based on feed, such as for example BSPT, NPT, UNC, etc. Carriage position can also be used to trigger a die release mechanism to ensure the proper thread length is cut. A die release and an associated die release lever are provided to release engagement of a die.

Motor speed can be determined by calculating spindle speed from known gear ratios used for thread length determination.

Previously described FIG. 11 is a flowchart of a preferred embodiment method 500 for performing a threading operation on a pipe end using the preferred device 110 in accordance with the present invention, in which carriage position is monitored.

Previously described FIG. 12 illustrates another preferred embodiment method 600 for performing a threading operation on a pipe or other workpiece using the preferred embodiment device 110 in accordance with the invention, in which motor revolutions and thread length are monitored.

D. Machine Wear (Cycle Counting Software Logic)

In this feature, multiple modes of operation are provided whereby a threading operation can be performed in which one or more parameters relating to cycle counting are monitored.

Electrical current can be used to alert a user of preventative maintenance milestones, e.g. 1000 thread cycles.

Previously described FIG. 9 is a flowchart illustrating a preferred method 300 for cycle counting utilizing electrical current consumption.

Previously described FIG. 10 is a flowchart illustrating another preferred method 400 for cycle counting using one or more sensors.

Previously described FIG. 13 is a graph illustrating current consumption characteristics for three different operations using the device. Specifically, current draws are depicted for cutting, reaming, and threading operations. As evident in FIG. 13, each operation can be characterized by a particular shape or profile noted on the graph. These shapes or profiles serve as "signatures" of the respective operation. Thus, it will be appreciated that software algorithms can be readily used to identify a particular operation by analyzing a current draw profile. Furthermore, one or more "ideal" current draw profiles can be stored, and against which, present current draw profiles are then compared to provide real-time indication as to the progress and state of an operation.

E. Interface

A preferred embodiment thread forming system and/or device comprises one or more interface components such as a keypad and a display monitor. As will be appreciated, the keypad and display monitor serve as an operator interface to receive one or more commands, inputs, or operational selections. Instructions and/or data can be entered via the keys or by a touchscreen. The display monitor serves to provide visual indication or information display of nearly any parameter associated with the device, its operation, and/or operations involving modifying pipe ends or other workpieces.

An alternate interface was developed for various prototypes and it is generally preferred over a keypad in several of the embodiments. The alternate interface includes push buttons and switches rather than a keypad as previously described. However, either configuration could be used.

The interface is located where the "Forward/Off/Reverse" switch 2 was described and shown in FIG. 3. The "Forward/Off/Reverse" switch is preferably integrated into the interface assembly.

Miscellaneous

It will be understood that the present invention devices, systems, and methods, are applicable to a very broad and diverse range of applications. For example, the invention is also expected to find use or application in powering a hydraulic or pneumatic power pack which may be used for any number of hydraulic or pneumatic tools and equipment. In addition, the present invention is also expected to find use in powering units for compression and/or crimping fittings or other mechanical components or hardware. Moreover, the invention is also expected to find use in pipe taping or internal threading applications.

The present invention also includes the various devices further comprising communication provisions for algorithms and/or providing instructional information to the device. Numerous interlocks can be provided to enable software downloads to the device for updating operational algorithms and/or providing data, instructions, or system documentation. For example, instructional text, photographs, and/or videos with supporting audio explanations could be provided by the device. Speaker and/or headphone jacks can be provided at the device to transmit audible information. Manuals could be stored in electronic format on the device in multiple languages. Such information could be displayed on one or more display outputs on the device. Provisions may be implemented to alert a supervisor or other individual if a fault state has been detected.

Additional sensors can be included in the device and on related components such as the footswitch or other user operated controls. It is also contemplated that motion sensors or other operator sensing systems could be used in conjunction with the various devices of the invention. Assessments of the input power can be made to prevent faulty operation of the device or to modify the operation of the device to suit the power source. Keycards or other identifying means could be used.

Many other benefits will no doubt become apparent from future application and development of this technology.

All patents, published applications, and articles noted herein are hereby incorporated by reference in their entirety.

It will be understood that any one or more feature or component of one embodiment described herein can be combined with one or more other features or components of another embodiment. Thus, the present invention includes any and all combinations of components or features of the embodiments described herein.

As described hereinabove, the present invention solves many problems associated with previous type devices. However, it will be appreciated that various changes in the details, materials and arrangements of components, which have been herein described and illustrated in order to explain the nature of the invention, may be made by those skilled in the art without departing from the principle and scope of the invention, as expressed in the appended claims.

What is claimed is:

1. A method for monitoring operation of a powered threader device, the method comprising:
   activating the threader device such that the device is placed in electrical communication with a source of electrical power;
   comparing the incoming electrical current to a threshold value, whereby if the incoming current is less than the threshold value the method is placed in a hold state, and if the incoming current is greater than the threshold value the method proceeds to an integrating operation;
   integrating electrical current consumed by the threader device as a function of time during at least a portion of operation of the threader device, to thereby produce an integration value;
   comparing the integration value to at least one benchmark or archived value stored in an electronic memory unit of the threader device, the benchmark or archived value selected from the group consisting of a value representative of a cutting operation, a value representative of a reaming operation, and a value representative of a threading operation; and identifying the type of operation performed by the threader device by determining which of the benchmark or archived values most closely corresponds to the integration value.

2. The method of claim 1 wherein the powered threader device comprises a brushless DC electric motor for performing the identified operation.

3. A method for monitoring operation of a powered threader device, the method comprising:

activating the threader device such that the device is placed in electrical communication with a source of electrical power;

comparing the incoming electrical current to a first threshold value, whereby if the incoming current is less than the first threshold value the method is placed in a hold state, and if the incoming current is greater than the first threshold value the method proceeds to a sensor monitoring operation;

monitoring at least one sensor output of the threader device, the sensor selected from the group consisting of a cutter sensor, a reamer sensor, and a thread or die sensor;

comparing magnitude of instantaneous electrical current consumed to a second threshold value, whereby if the instantaneous current magnitude is greater than the second threshold value, the method proceeds to another comparing operation;

comparing an output of the at least one sensor and the instantaneous electrical current to at least one set of benchmarks or archived values selected from the group consisting of values representative of a cutting operation, values representative of a reaming operation, and values representative of a threading operation; and identifying the type of operation performed by the threader device by determining which of the benchmark or archived values most closely correspond to the output of the at least one sensor and the instantaneous electrical current.

4. The method of claim 3 wherein the powered threader device comprises a brushless DC electric motor for performing the identified operation.

\* \* \* \* \*